United States Patent
Liberg et al.

(10) Patent No.: US 9,894,186 B2
(45) Date of Patent: Feb. 13, 2018

(54) SIMPLIFIED NOTIFICATION OF NETWORK TRIGGERED REPORTING—WIRELESS ACCESS NODE (E.G., BSS) AND METHOD

(71) Applicant: TELEFONAKTIEBOLAGET L M ERICSSON (PUBL), Stockholm (SE)

(72) Inventors: Olof Liberg, Stockholm (SE); Paul Schliwa-Bertling, Ljungsbro (SE); Ravitej Ballakur, Bangalore (IN); John Walter Diachina, Garner, NC (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 76 days.

(21) Appl. No.: 14/848,041

(22) Filed: Sep. 8, 2015

(65) Prior Publication Data
US 2016/0073388 A1 Mar. 10, 2016

Related U.S. Application Data

(60) Provisional application No. 62/047,838, filed on Sep. 9, 2014, provisional application No. 62/049,976, filed
(Continued)

(51) Int. Cl.
*H04W 72/04* (2009.01)
*H04W 68/00* (2009.01)
(Continued)

(52) U.S. Cl.
CPC ............ *H04L 69/161* (2013.01); *H04L 67/12* (2013.01); *H04L 67/327* (2013.01);
(Continued)

(58) Field of Classification Search
CPC ..... H04L 69/161; H04L 69/164; H04L 67/12; H04L 67/327; H04W 72/042;
(Continued)

(56) References Cited

U.S. PATENT DOCUMENTS 6,671,735 B1 * 12/2003 Bender ............ H04L 29/12018
370/351
8,437,782 B2 5/2013 Bergqvist et al.
(Continued)

FOREIGN PATENT DOCUMENTS

EP 2605606 A2 6/2013
EP 2739110 A1 6/2014
(Continued)

OTHER PUBLICATIONS

3$^{rd}$ Generation Partnership Project; Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 4), 3GPP TS 44.060 V.5.0.0 (Feb. 2002).
(Continued)

*Primary Examiner* — Mohammad Adhami
*Assistant Examiner* — Shailendra Kumar

(57) ABSTRACT

A first Core Network (CN) node (e.g., Gateway GPRS Support Node), a second CN node (e.g., Serving GPRS Support Node) and a wireless access node (e.g., Base Station Subsystem) are described herein that are configured to efficiently deliver a network triggered report notification to a wireless device (e.g., Internet of Things device).

18 Claims, 13 Drawing Sheets

Related U.S. Application Data on Sep. 12, 2014, provisional application No. 62/053,031, filed on Sep. 19, 2014.

(51) Int. Cl.
| | |
|---|---|
| *H04L 29/06* | (2006.01) |
| *H04W 4/00* | (2009.01) |
| *H04L 29/08* | (2006.01) |
| *H04W 88/16* | (2009.01) |
| *H04W 68/02* | (2009.01) |

(52) U.S. Cl.
CPC ........... *H04L 69/164* (2013.01); *H04W 4/005* (2013.01); *H04W 68/02* (2013.01); *H04W 72/042* (2013.01); *H04W 72/044* (2013.01); *H04W 72/0413* (2013.01); *H04W 88/16* (2013.01); *H04W 68/005* (2013.01)

(58) Field of Classification Search
CPC ........... H04W 72/044; H04W 72/0413; H04W 4/005; H04W 88/16; H04W 68/005
See application file for complete search history.

(56) References Cited

U.S. PATENT DOCUMENTS

| | | | |
|---|---|---|---|
| 2005/0192017 A1 | 9/2005 | Choi et al. | |
| 2007/0105600 A1 | 5/2007 | Mohanty et al. | |
| 2009/0017845 A1 | 1/2009 | Wu et al. | |
| 2009/0176515 A1* | 7/2009 | Willey | H04W 68/025 455/458 |
| 2010/0323610 A1 | 12/2010 | Li et al. | |
| 2011/0264740 A1 | 10/2011 | Diachina et al. | |
| 2011/0274042 A1* | 11/2011 | Diachina | H04W 4/005 370/328 |
| 2011/0280184 A1 | 11/2011 | Diachina et al. | |
| 2013/0070589 A1 | 3/2013 | Diachina et al. | |
| 2013/0070699 A1* | 3/2013 | Diachina | H04W 72/14 370/329 |
| 2013/0215843 A1* | 8/2013 | Diachina | H04W 74/00 370/329 |
| 2013/0279372 A1* | 10/2013 | Jain | H04W 4/06 370/254 |
| 2014/0089442 A1 | 3/2014 | Kim et al. | |
| 2014/0302846 A1 | 10/2014 | Zou | |
| 2015/0195094 A1 | 7/2015 | Yu et al. | |
| 2015/0195831 A1* | 7/2015 | Du | H04W 74/004 370/329 |
| 2015/0230279 A1 | 8/2015 | Lee et al. | |
| 2015/0264148 A1 | 9/2015 | Skiba et al. | |

FOREIGN PATENT DOCUMENTS

| | | |
|---|---|---|
| WO | WO 2011/053219 | 5/2011 |
| WO | WO 2014/019235 A1 | 2/2014 |

OTHER PUBLICATIONS

3$^{rd}$ Generation Partnership Project; Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 10), 3GPP TS 44.060 V.10.0.0 (Mar. 2010).

3$^{rd}$ Generation Partnership Project; Technical Specification Group Services and System Aspects; Architecture enhancements to facilitate communications with packet data networks and applications (Release 12), 3GPP TS 23.682 V.12.2.0 (Jun. 2014).

3$^{rd}$ Generation Partnership Project; Technical Specification Group GSM/EDGE Radio Access Network; General Packet Radio Service (GPRS); Base Station System (BSS)—Serving GPRS Support Node (SGSN); BSS GPRS Protocol (BSSGP) (Release 12), 3GPP TS 48.018 V.12.2.0 (Mar. 2014).

3$^{rd}$ Generation Partnership Project; Technical Specification Group GSM/EDGE Radio Access Network; Radio subsystem synchronization (Release 11), 3GPP TS 45.010 V.11.0.0 (Aug. 2012).

3GPP TR 23.888 V11.0.0 (Sep. 2012), 3rd Generation Partnership Project; Technical Specification Group Services and System Aspects; System improvements for Machine-Type Communications (MTC)(Release 11), Sep. 18, 2012 (Sep. 18, 2012), the whole document.

* cited by examiner

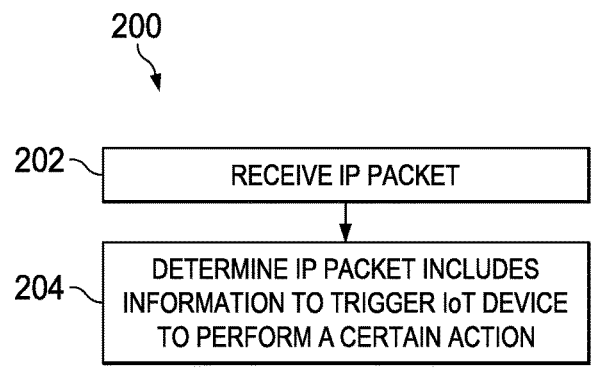
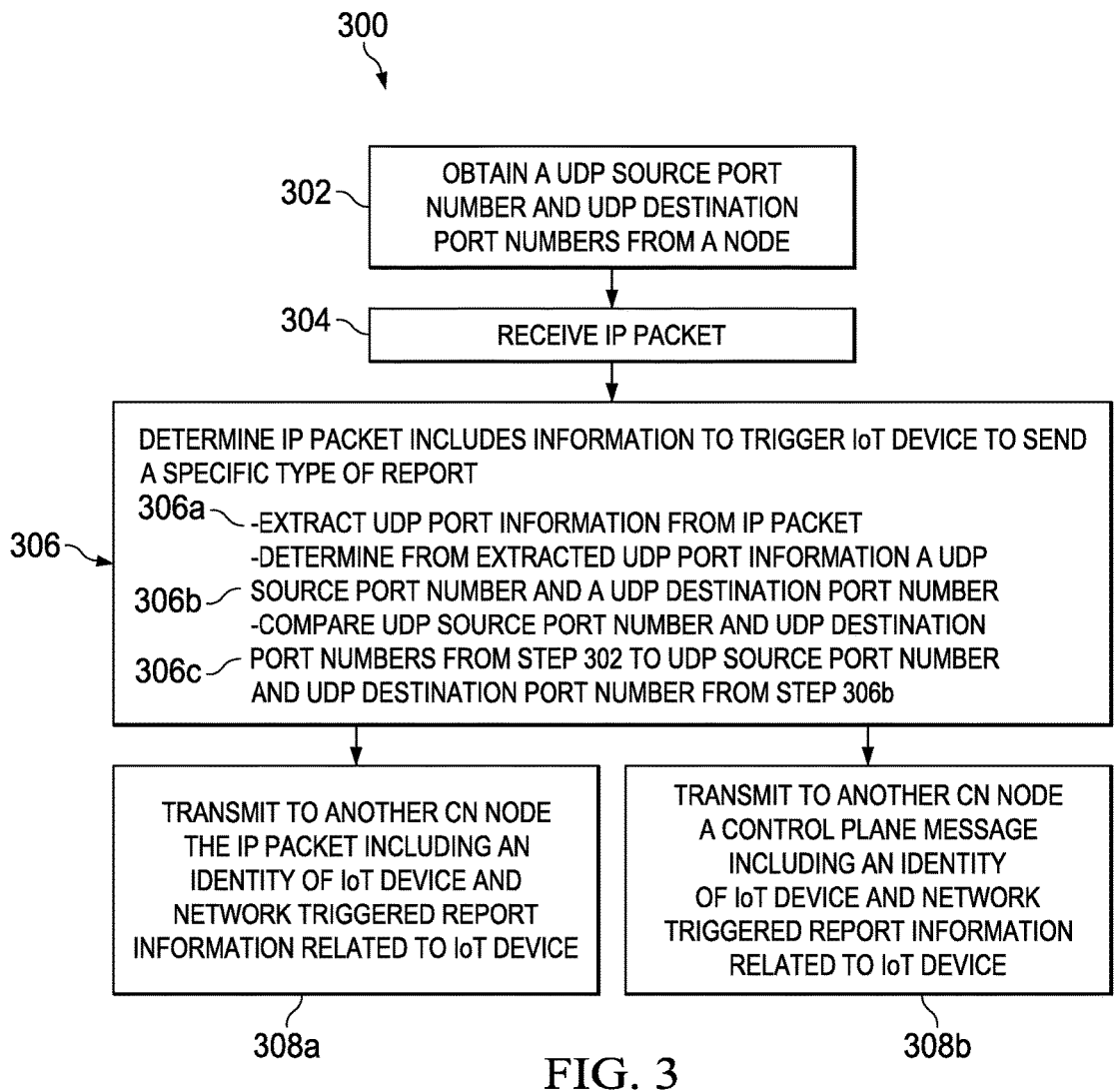

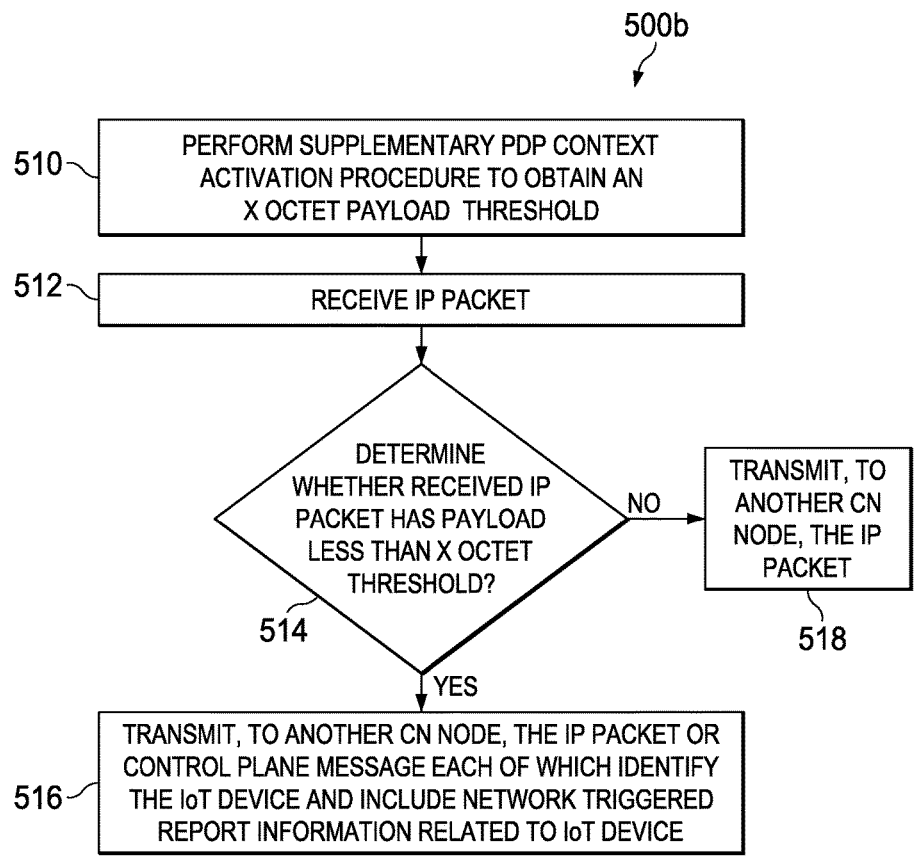
FIG. 5B
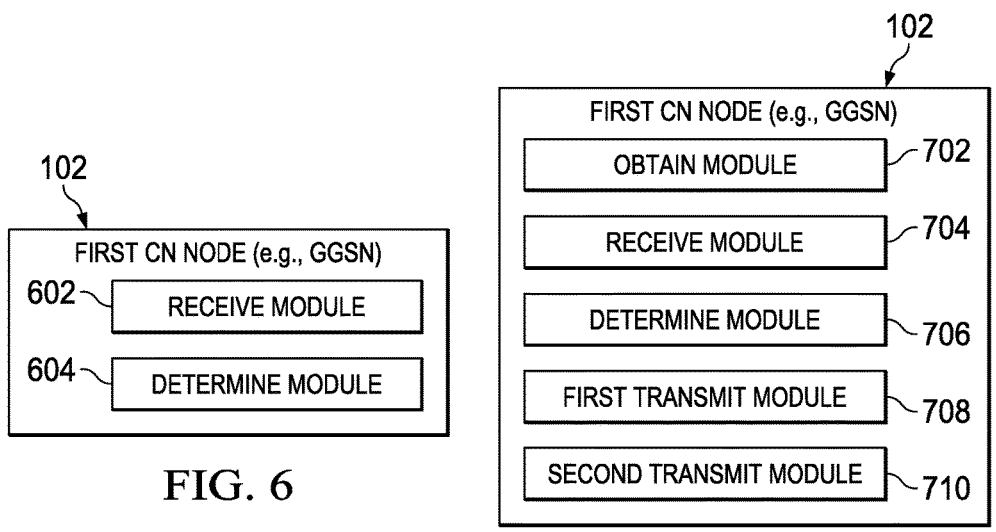
FIG. 6
FIG. 7

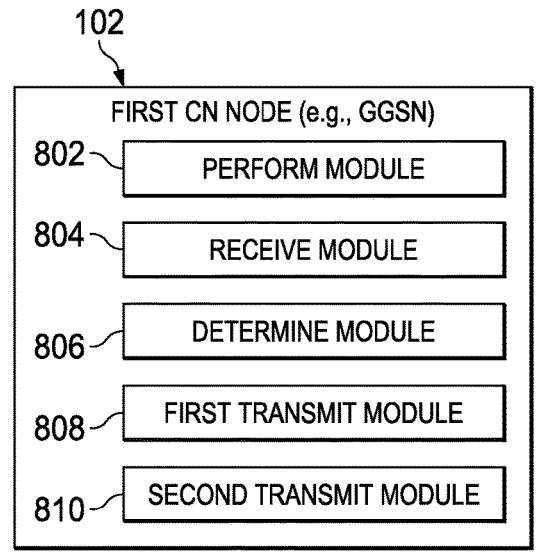
FIG. 8
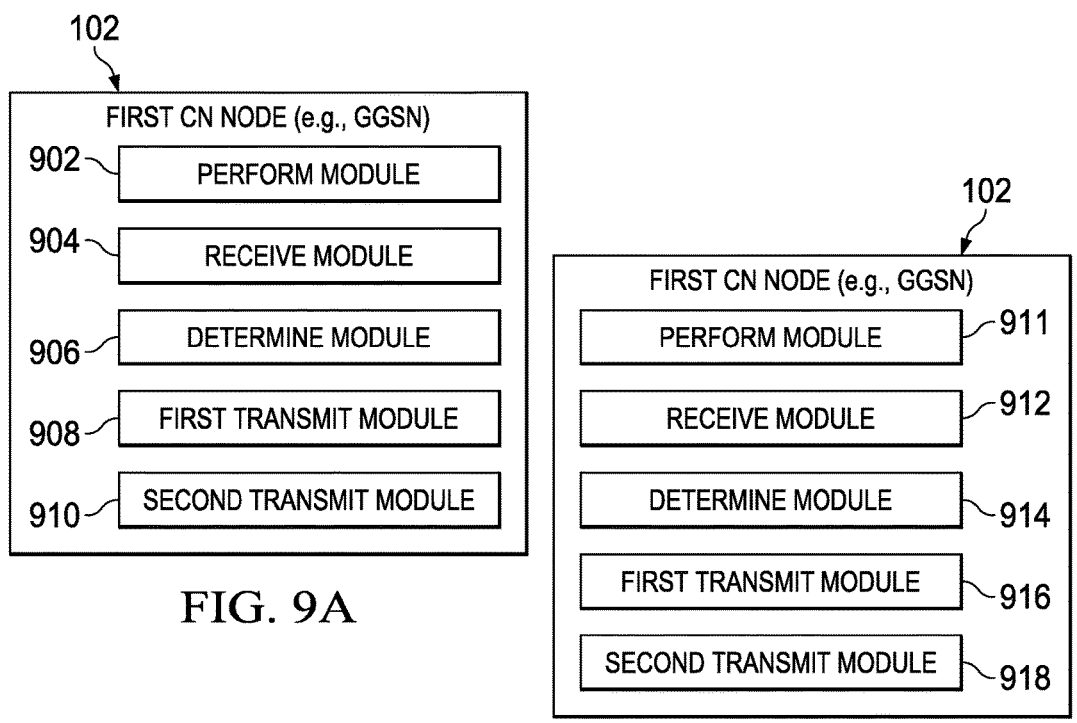
FIG. 9A
FIG. 9B

SIMPLIFIED NOTIFICATION OF NETWORK TRIGGERED REPORTING—WIRELESS ACCESS NODE (E.G., BSS) AND METHOD

CLAIM OF PRIORITY

This application claims the benefit of priority to: (1) U.S. Provisional Application No. 62/047,838, filed on Sep. 9, 2014; (2) U.S. Provisional Application No. 62/049,976, filed on Sep. 12, 2014; and (3) U.S. Provisional Application No. 62/053,031, filed on Sep. 19, 2014. The entire contents of these documents are hereby incorporated herein by reference for all purposes.

RELATED PATENT APPLICATIONS

This application is related to the following co-filed applications: (1) U.S. application Ser. No. 14/848,017 entitled "Simplified Notification of Network Triggered Reporting—First Core Network Node (e.g., GGSN) and Method"(2) U.S. application Ser. No. 14/848,028 entitled "Simplified Notification of Network Triggered Reporting—Second Core Network Node (e.g., SGSN) and Method"; and (3) U.S. application Ser. No. 14/848,048entitled "Simplified Notification of Network Triggered Reporting—Wireless Device (e.g., IoT Device) and Method". The entire contents of these documents are hereby incorporated herein by reference for all purposes.

TECHNICAL FIELD

The present disclosure relates generally to the wireless communications field and, more particularly, to a first Core Network (CN) node (e.g., Gateway GPRS Support Node), a second CN node (e.g., Serving GPRS Support Node) and a wireless access node (e.g., Base Station Subsystem) that are configured to efficiently deliver a network triggered report notification to a wireless device (e.g., Internet of Things device).

BACKGROUND

The following abbreviations and terms are herewith defined, at least some of which are referred to within the following description and drawings of the present disclosure.
3GPP 3rd-Generation Partnership Project
AAA Authentication, Authorization, and Accounting
AGCH Access Grant Channel
AS Application Server
ASIC Application Specific Integrated Circuit
ATI Additional TBF Information
BLER Block Error Rate
BSS Base Station Subsystem
CDF Charging Data Function
CGF Charging Gateway Function
CDMA Code Division Multiple Access
CN Core Network
DSP Digital Signal Processor
GGSN Gateway GPRS Support Node
GMSC Gateway MSC
GPRS General Packet Radio Service
GSM Global System for Mobile Communications
GW Gateway
HARQ Hybrid Automatic Repeat Request
HPLMN Home Public Land Mobile Network
HSS Home Subscriber Server
IA Immediate Assignment
IE Information Element
IP Internet Protocol
IoT Internet of Things
IWF InterWorking Function
IWMSC InterWorking MSC
LLC Logical Link Control
LTE Long-Term Evolution
MAC Medium Access Control
M2M Machine-to-Machine
MME Mobile Management Entity
MS Mobile Station
MSC Mobile Switching Centre
MSID Mobile Station Identifier
MTC Machine-Type Communications
NAS Non-Access Stratum
PDP Packet Data Protocol
P-GW Packet-Gateway
PLMN Public Land Mobile Network
RACH Random Access Channel
RAN Radio Access Network
RLC Radio Link Control
RRC Radio Resource Control
SC Service Centre
SCS Services Capability Server
SGSN Serving GPRS Support Node
S-GW Serving Gateway
SM Session Management
SME Short Message Entity
SMS Short Message Service
SNDCP Sub Network Dependent Convergence Protocol
TBF Temporary Block Flow
TS Technical Specification
UDP User Datagram Protocol
UE User Equipment
VPLMN Visited Public Land Mobile Network
WCDMA Wideband Code Division Multiple Access
WiMAX Worldwide Interoperability for Microwave Access
  Coverage Class: At any point in time a device belongs to a specific uplink/downlink coverage class which determines the total number of blind transmissions to be used when transmitting/receiving radio blocks. An uplink/downlink coverage class applicable at any point in time can differ between different logical channels. Upon initiating a system access a device determines the uplink/downlink coverage class applicable to the RACH/AGCH based on estimating the number of blind repetitions of a radio block needed by the BSS receiver/device receiver to experience a BLER (block error rate) of approximately 10%. The BSS determines the uplink/downlink coverage class to be used by a device on the device's assigned packet channel resources based on estimating the number of blind repetitions of a radio block needed to satisfy a target BLER and considering the number of HARQ retransmissions (of a radio block) that will, on average, result from using that target BLER.
  Internet of Things (IoT) devices: The Internet of Things (IoT) is the network of physical objects or "things" embedded with electronics, software, sensors, and connectivity to enable objects to exchange data with the manufacturer, operator and/or other connected devices based on the infrastructure of the International Telecommunication Union's Global Standards Initiative. The Internet of Things allows objects to be sensed and controlled remotely across existing network infrastructure creating opportunities for more direct integration between the physical world and computer-based systems, and resulting in improved efficiency, accuracy and economic benefit. Each thing is uniquely identifiable through its embedded computing system but is able to interoperate within the existing Internet infrastructure. Experts estimate that the IoT will consist of almost 50 billion objects by 2020.

There will be a need for wireless communication systems to support Network Triggered Reporting, wherein cellular IoT devices (or any other type of wireless device) can periodically receive notifications (e.g., triggers) which indicate that the cellular IoT devices are to transmit certain information of interest (e.g., telemetry) to a processing node (e.g., a machine type communication (MTC) server, a services capability server (SCS)) reachable through the Internet Protocol (IP) network. When considering that a large portion of cellular IoT devices are expected to support a very simplified set of functions (e.g., only being able to report limited sets of telemetric information), it becomes apparent that delivering IP packets to such devices as the means for triggering the devices to transmit a report is unnecessarily demanding from both a signaling overhead and bandwidth requirements perspective.

For example, transmitting an IP packet to an IoT device to trigger the IoT device to transmit a report will involve the inclusion of the IP layer and, therefore, 40 octets of fixed overhead (i.e., for IPv6) from the IP layer alone. Factoring into this overhead the inclusion of optional IP header information and other layers (e.g., Radio Link Control (RLC)/ Medium Access Control (MAC), Logical Link Control (LLC), Sub Network Dependent Convergence Protocol (SNDCP), User Datagram Protocol (UDP)) can push the total overhead up to a level approaching 100 octets, which is quite excessive considering that a few octets (or even less than 1 octet) of payload information (i.e., the trigger information) may be all that needs to be delivered to the application layer of the IoT device.

Accordingly, a more bandwidth and signaling efficient mechanism for triggering cellular IoT devices to transmit reports is desirable. Further, this is not a problem that is unique to IoT devices. A similar problem can be observed with other types of wireless devices (e.g., Machine-Type Communications (MTC) devices). This problem and other problems associated with the prior art are addressed in the present disclosure.

SUMMARY

A core network (CN) node (e.g., GGSN), another CN node (e.g., SGSN), a wireless access node (e.g., BSS), a wireless device (e.g., IoT device), and various methods for addressing at least the aforementioned problem are described in the independent claims. Advantageous embodiments of the CN node (e.g., GGSN), the another CN node (e.g., SGSN), the wireless access node (e.g., BSS), the wireless device (e.g., IoT device), and the various methods are further described in the dependent claims.

In one aspect, the present disclosure provides a CN node (e.g., GGSN) within a wireless communication system. The CN node comprises a processor and a memory that stores processor-executable instructions, wherein the processor interfaces with the memory to execute the processor-executable instructions, whereby the CN node is operable to perform a receiving operation and a determining operation. In the receiving operation, the CN node receives an IP packet originated by an external node. In the determining operation, the CN node determines that the IP packet includes information to trigger a wireless device to perform a certain action. The CN node in performing the determining operation has an advantage in that signaling and bandwidth can now be substantially reduced when triggering the wireless device to perform the certain action.

In another aspect, the present disclosure provides a method in a CN node (e.g., GGSN) within a wireless communication system. The method comprises a receiving step and a determining step. In the receiving step, the CN node receives an IP packet originated by an external node. In the determining step, the CN node determines that the IP packet includes information to trigger a wireless device to perform a certain action. The CN node in performing the determining step has an advantage in that signaling and bandwidth can now be substantially reduced when triggering the wireless device to perform the certain action.

In yet another aspect, the present disclosure provides a CN node (e.g., SGSN) within a wireless communication system. The CN node comprises a processor and a memory that stores processor-executable instructions, wherein the processor interfaces with the memory to execute the processor-executable instructions, whereby the CN node is operable to perform a receiving operation and a transmitting operation. In the receiving operation, the CN node receives, from another CN node, an indication that a wireless device is being requested to perform a certain action. In the transmitting operation, the CN node transmits, to at least one wireless access node, a paging request message in response to receiving the indication, wherein the paging request message indicates that the wireless device is being requested to perform the certain action. The CN node in performing the transmitting operation has an advantage in that signaling and bandwidth can now be substantially reduced when triggering the wireless device to perform the certain action.

In yet another aspect, the present disclosure provides a method in a CN node (e.g., SGSN) within a wireless communication system. The method comprises a receiving step and a transmitting step. In the receiving step, the CN node receives, from another CN node, an indication that a wireless device is being requested to perform a certain action. In the transmitting step, the CN node transmits, to at least one wireless access node, a paging request message in response to receiving the indication, wherein the paging request message indicates that the wireless device is being requested to perform the certain action. The CN node in performing the transmitting step has an advantage in that signaling and bandwidth can now be substantially reduced when triggering the wireless device to perform the certain action.

In yet another aspect, the present disclosure provides a wireless access node (e.g., BSS) within a wireless communication system. The wireless access node comprises a processor and a memory that stores processor-executable instructions, wherein the processor interfaces with the memory to execute the processor-executable instructions, whereby the wireless access node is operable to perform a receiving operation. In the receiving operation, the wireless access node receives, from a CN node, a paging request message which (1) indicates that a wireless device is being requested to perform a certain action, wherein the certain action is to transmit a specific type of report from the wireless device to an external node, and (2) identifies the wireless device using a 32-bit Mobile Station Identifier (MSID). The wireless access node in performing the receiving operation has an advantage in that signaling and bandwidth can now be substantially reduced when triggering the wireless device to perform the certain action.

In yet another aspect, the present disclosure provides a method in a wireless access node (e.g., BSS) within a wireless communication system. The method comprises a receiving step. In the receiving step, the wireless access node receives, from a CN node, a paging request message which (1) indicates that a wireless device is being requested to perform a certain action, wherein the certain action is to transmit a specific type of report from the wireless device to an external node, and (2) identifies the wireless device using a 32-bit Mobile Station Identifier (MSID). The wireless access node in performing the receiving step has an advantage in that signaling and bandwidth can now be substantially reduced when triggering the wireless device to perform the certain action.

In yet another aspect, the present disclosure provides a wireless device (e.g., IoT device) within a wireless communication system. The wireless device comprises a processor and a memory that stores processor-executable instructions, wherein the processor interfaces with the memory to execute the processor-executable instructions, whereby the wireless device is operable to perform a receiving operation. In the receiving operation, the wireless device receives, from a wireless access node, a message which indicates that the wireless device is being requested to perform a certain action, wherein the certain action is to transmit a specific type of report from the wireless device to an external node. The wireless device in performing the receiving operation has an advantage in that signaling and bandwidth can now be substantially reduced when triggering the wireless device to perform the certain action.

In yet another aspect, the present disclosure provides a method in a wireless device (e.g., IoT device) within a wireless communication system. The method comprises a receiving step. In the receiving step, the wireless device receives, from a wireless access node, a message which indicates that the wireless device is being requested to perform a certain action, wherein the certain action is to transmit a specific type of report from the wireless device to an external node. The wireless device in performing the receiving step has an advantage in that signaling and bandwidth can now be substantially reduced when triggering the wireless device to perform the certain action.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings:

FIG. 2 is a flowchart of a method implemented in the first CN node (e.g., GGSN) in accordance with the present disclosure;

FIG. 3 is a flowchart of a method implemented in the first CN node (e.g., GGSN) in accordance with one embodiment of the present disclosure;

FIG. 5B is a flowchart of a method implemented in the first CN node (e.g., GGSN) in accordance with yet another embodiment of the present disclosure;

FIG. 6 is a block diagram illustrating structures of an exemplary first CN node (e.g., GGSN) configured in accordance with the present disclosure;

FIG. 7 is a block diagram illustrating structures of an exemplary first CN node (e.g., GGSN) configured in accordance with an embodiment of the present disclosure;

FIG. 8 is a block diagram illustrating structures of an exemplary first CN node (e.g., GGSN) configured in accordance with another embodiment of the present disclosure;

FIG. 9A is a block diagram illustrating structures of an exemplary first CN node (e.g., GGSN) configured in accordance with yet another embodiment of the present disclosure;

FIG. 9B is a block diagram illustrating structures of an exemplary first CN node (e.g., GGSN) configured in accordance with yet another embodiment of the present disclosure;

DETAILED DESCRIPTION

Figure 1:
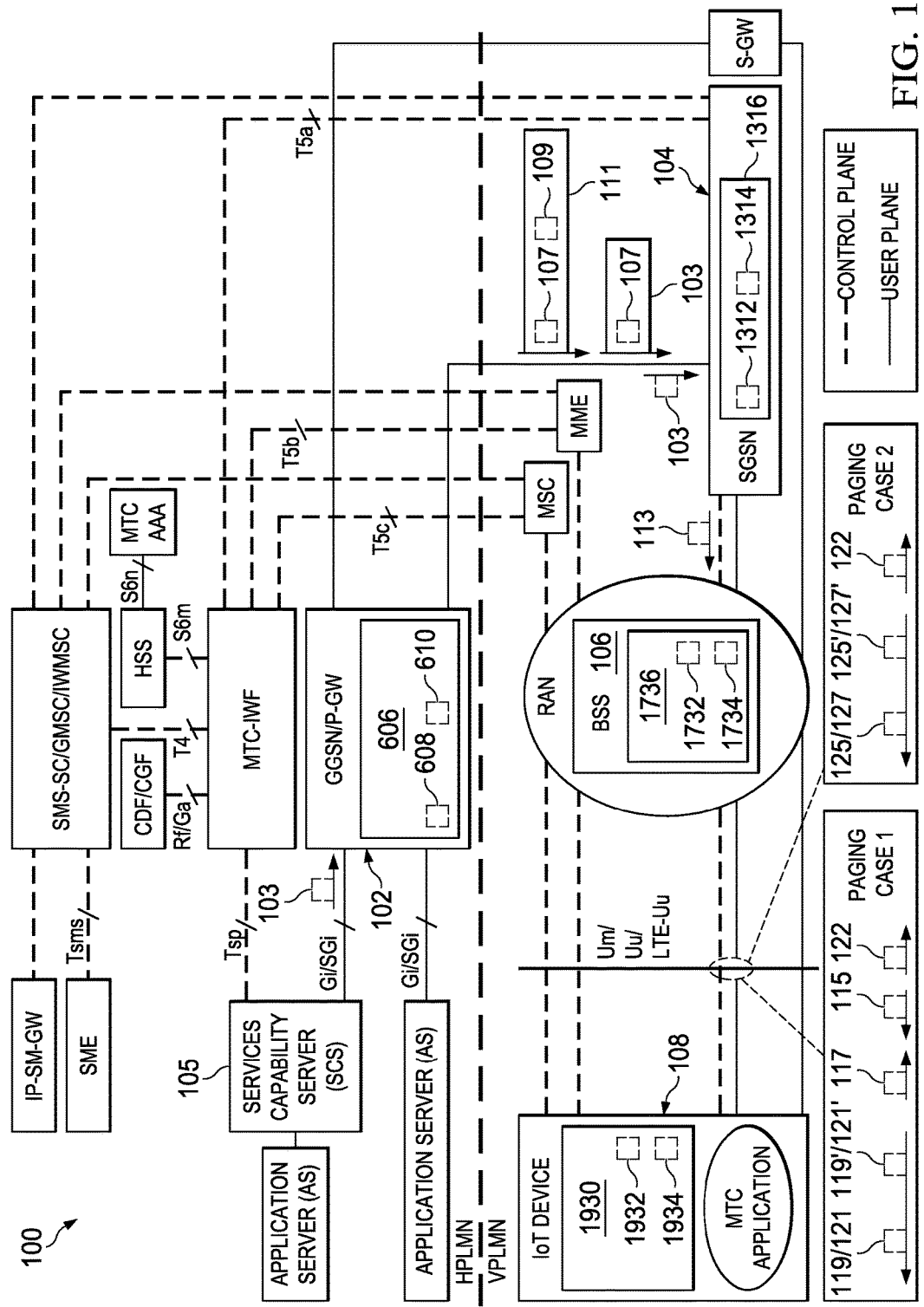
FIG. 1 is a diagram of an exemplary wireless communication network which includes a first CN node (e.g., GGSN), a second CN node (e.g., SGSN), a wireless access node (e.g., BSS), and a wireless device (e.g., IoT device), each of which is configured in accordance with the present disclosure.

FIG. 1 is a diagram of an exemplary wireless communication network 100 as shown in section 4.2 of 3GPP TS 23.682 V12.2.0 (Jun. 24, 2014) (the entire contents of which are incorporated herein by reference) but where a first CN node 102 (e.g., GGSN 102), a second CN node 104 (e.g., SGSN 104), a wireless access node 106 (e.g., BSS 106), and an IoT device 108 (e.g., UE 108, wireless device 108) have all been enhanced in accordance with the present disclosure. It should be appreciated that those skilled in the art will readily understand the basic architecture and operation of the exemplary wireless communication network 100 such that only the enhanced first CN node 102 (e.g., GGSN 102), second CN node 104 (e.g., SGSN 104), wireless access node 106 (e.g., BSS 106), and IoT device 108 (e.g., UE 108, wireless device 108) and their respective functionalities which are needed to describe the present disclosure are discussed herein. Further, those skilled in the art should readily appreciate that although the techniques of the present disclosure as described herein are applied to the GPRS wireless communication network 100, the techniques of the present disclosure are also generally applicable to other types of wireless communication systems, including, for example, WCDMA, LTE, and WiMAX communication systems.

In general, the present disclosure provides a solution which allows the first CN node 102 (e.g., GGSN 102) to determine when an IP packet 103 received from an external node 105 (e.g., SCS 105, MTC server) has been transmitted expressly for the purpose of notifying the IoT device 108 to transmit a specific type of network triggered report. Once this case is recognized by the first CN node 102, the delivery of an IP packet (containing a network triggered report notification) to the target IoT device 108 can be avoided in favor of using any one of several alternate mechanisms that allow for delivering the network triggered report notification to the IoT device 108 in a far more signaling and bandwidth efficient manner. These alternative mechanisms are discussed in detail below with respect to four different embodiments.

First Embodiment

In this example, the external node 105 (e.g., SCS 105) uses the UDP/IP stack when communicating with the first CN node 102 (e.g., GGSN 102), where the dynamic or private ports available at the UDP layer are per 3GPP TS 23.682 V12.2.0 (Jun. 24, 2014) and include those with port values ranging from 49152 through 65535.

The first CN node 102 (e.g., GGSN 102) receives an IP packet 103 and extracts therefrom the corresponding UDP port information (i.e., the UDP/IP stack is assumed to be used), from which the first CN node 102 (e.g., GGSN 102) then determines the UDP source port (e.g., UDP source port number) and the UDP destination port (e.g., UDP destination port number).

The extracted UDP port information can be used by the first CN node 102 (e.g., GGSN 102) to determine that the purpose of the IP packet 103 is to notify the IoT device 108 of Network Triggered Reporting. More specifically, the private port values available at the UDP layer can be used within the context of Operator and MTC service provider agreements to allow the first CN node 102 (e.g., GGSN 102) to make this determination. For example, the different UDP source port number values within the private range can be used for indicating a network triggered report request, where each value may correspond to a different MTC service provider. Further, the specific type of report to be triggered can be derived from the UDP destination port number of the IP packet 103 (e.g., UDP destination port number 49152 indicates a specific type of report to be triggered).

The first CN node 102 (e.g., GGSN 102) can then transmit the IP packet 103 along with the corresponding network triggered report information 107 (e.g., specific type of report) to the second CN node 104 (e.g., SGSN 104). It may not be necessary to relay the IP packet 103 including the corresponding network triggered report information 107 to the second CN node 104 (e.g., SGSN 104), since the only information of interest at this point will be the identity 109 of the target IoT device 108 and the network triggered report related information 107 (i.e., type of report to be triggered). In this case, a new control plane message 111 can be used to relay the device identity 109 and the trigger related information 107 from the first CN node 102 (e.g., GGSN 102) to the second CN node 104 (e.g., SGSN 104). Alternatively, the first CN node 102 (e.g., GGSN 102) may choose to relay the IP packet 103 (containing the information used to determine that the purpose of the IP packet 103 is to notify the IoT device 108 of Network Triggered Reporting) directly to the second CN node 104 (e.g., SGSN 104), which can then perform a similar UDP port analysis to determine that the purpose of the IP packet 103 is to notify the IoT device 108 of Network Triggered Reporting and identify the type of report to be triggered.

In any case, the second CN node 104 (e.g., SGSN 104) when there is Network Triggered Reporting can then transmit a corresponding paging request message 113 to one or more wireless access nodes 106 (e.g., BSSs 106—only one shown herein), where the paging request message 113 may explicitly indicate that a network triggered report is being requested from IoT device 108 and the specific type of report that is requested. For example, this can be accomplished by modifying legacy paging request messages (e.g., as defined in the 3GPP TS 48.018 V12.2.0 (Mar. 19, 2014)—the entire contents of which are hereby incorporated by reference herein) to include a new information element, by modifying existing information elements within legacy paging request messages, or by introducing new paging request messages in support of Network Triggered Reporting. After the second CN node 104 (e.g., SGSN 104) transmits the paging request message 113, the second CN node 104 (e.g., SGSN 104) no longer needs to be concerned with the paging transaction, as the second CN node 104 (e.g., SGSN 104) can, at this point, safely assume that the appropriate wireless access node 106 (e.g., BSS 106) will deliver the paging request according to the next occurrence of the nominal paging group of the target IoT device 108. In other words, the second CN node 104 (e.g., SGSN 104) will not be expecting a paging response from the wireless access node 106 (e.g., BSS 106). This same behavior of the second CN node 104 (e.g., SGSN 104) also applies for the other embodiments described below.

Upon receiving the paging request message 113, the wireless access node 106 (e.g., BSS 106) can then proceed in any one of a number of ways based on whether or not the wireless access node 106 (e.g., BSS 106) knows the specific cell in which the target IoT device 108 is located and being served. The wireless access node 106 (e.g., BSS 106) may have knowledge of whether or not an IoT device 108 is stationary (i.e., therefore knowing the precise cell within which the IoT device 108 is located) based on, for example, additional information included within the received paging request message 113, device specific mobility tracking information that the wireless access node 106 (e.g., BSS 106) maintains, or a combination of both. Two different exemplary ways (i.e., paging case 1 and paging case 2) that the wireless access node 106 (e.g., BSS 106) can proceed upon receiving the paging request message 113 are discussed next.

Paging Case 1

This procedure is performed for the purpose of delivering the network triggered report related information 107 to the IoT device 108 (i.e., there is no downlink payload to deliver to the IoT device 108) when the wireless access node 106

(e.g., BSS 106) does not know the specific cell in which the IoT device 108 is located and being served. In the paging case 1, the wireless access node 106 (e.g., BSS 106) can proceed as follows:

The wireless access node 106 (e.g., BSS 106) receives the paging request message 113 from the second CN node 104 (e.g., SGSN 104) wherein the target IoT device 108 is identified using a full 32-bit MSID, and an MS-specific indicator which indicates if the target IoT device 108 is being paged to trigger an uplink report. Additionally, the second CN node 104 (e.g., SGSN 104) indicates in the paging request message 113 that the paged IoT device 108 supports the procedure associated with paging case 1. It is to be noted that the paging request message 113 may indicate multiple IoT devices 108, each of which are indicated with a full 32-bit MSID and are being paged to trigger an uplink report.

The wireless access node 106 (e.g., BSS 106) responds by transmitting a paging request message 115 (e.g., identified by a new value of the Paging Request Type IE, for example) that identifies the target IoT device 108 using a reduced MSID (e.g., the 16 least significant bits of each MSID received from the second CN node 104 (e.g., SGSN 104)) along with an MS-specific trigger indicator set to indicate that a trigger condition exists. It is to be noted that the paging request message 115 may be transmitted to multiple IoT devices 108, each of which are indicated with a reduced MSID and are being paged to trigger an uplink report.

Upon receiving the paging request message 115 containing a reduced MSID (e.g., that matches the 16 least significant bits of its full MSID), the IoT device 108 attempts a system access whereby the IoT device 108 transmits a Packet Channel Request 117 on the RACH (which may be repeated multiple times depending on the coverage class of the IoT device 108) indicating that the IoT device 108 is responding to the paging request message 115 and indicates a trigger condition and includes the full MSID of the IoT device 108. It is to be noted that other IoT devices 108 upon receiving the paging request message 115 may also transmit their respective Packet Channel Request 117 in a similar manner to the wireless access node 106 (e.g., BSS 106).

The wireless access node 106 (e.g., BSS 106) upon receiving the Packet Channel Request 117 from one or more IoT devices 108 can respond as per alternative 1 or alternative 2 described below which ensures that only the intended IoT device 108 responds to the trigger notification.

Alternative 1: The wireless access node 106 (e.g., BSS 106) can transmit an IA message 119 (assigning uplink packet resources) that includes one or more instances of the full 32-bit MSID of the IoT devices 108 for which the wireless access node 106 (e.g., BSS 106) recently received Packet Channel Requests 117 indicating a response to the paging request message 115 and for which the wireless access node 106 (e.g., BSS 106) received the paging request message 113 from the second CN node 104 (e.g., SGSN 104). This allows an unintended IoT device 108 (not shown) to determine that the unintended IoT device 108 was not targeted by the previous paging request message 115 (i.e., since the unintended IoT device 108's full MSID will not match any of the full MSIDs included in the IA message 119) and therefore return to Idle mode. Additional information to complete the assignment of uplink packet resources is sent using a subsequent ATI message 121, for which only the intended IoT device 108 (shown) will be waiting.

Alternative 2: The wireless access node 106 (e.g., BSS 106) can transmit an IA message 119' (assigning uplink packet resources) that includes one or more instances of a reduced MSID (e.g., the 16 least significant bits of the full MSID) of the IoT devices 108 for which the wireless access node 106 (e.g., BSS 106) recently received Packet Channel Requests 117 indicating a response to the paging request message 115 and for which the wireless access node 106 (e.g., BSS 106) received the paging request message 113 from the second CN node 104 (e.g., SGSN 104). In this case, the remaining bits of each of the intended 32-bit MSIDs are transmitted using a subsequent ATI message 121' such that the reduced MSID transmitted in the IA message 119' combined with the remaining MSID bits transmitted in the ATI message 121' represent a full MSID of the IoT device 108 for which the wireless access node 106 (e.g., BSS 106) received a paging request message 113 from the second CN node 104 (e.g., SGSN 104). The IoT device 108 will therefore be able to conclusively determine if its system access attempt was successful as a result of receiving a full MSID carried by the combination of the IA message 119' and the ATI message 121'. If the MSID that a specific IoT device 108 receives from the combination of these messages 119' and 121' does not match the IoT device's assigned MSID, then that IoT device 108 will abort its current access attempt and return to Idle mode.

If the signaling of alternative 1 and 2 is successful then the triggered IoT device(s) 108 use their assigned uplink resources to transmit their uplink reports 122 to the wireless access node 106 (e.g., BSS 106).

Paging Case 2

This procedure is performed for the purpose of delivering the network triggered report related information 107 to the IoT device 108 (i.e., there is no downlink payload to deliver to the IoT device 108), wherein the wireless access node 106 (e.g., BSS 106) skips the paging step because the wireless access node 106 (e.g., BSS 106) already has knowledge of the specific cell that is serving the target IoT device 108.

The wireless access node 106 (e.g., BSS 106) receives the paging request message 113 from the second CN node 104 (e.g., SGSN 104) wherein the target IoT device 108 is identified using a full 32-bit MSID, and an MS-specific indicator which indicates if the target IoT device 108 is being paged to trigger an uplink report. Additionally, the second CN node 104 (e.g., SGSN 104) indicates in the paging request message 113 that the paged IoT device 108 supports the procedure associated with paging case 2. It is to be noted that the paging request message 113 may indicate multiple IoT devices 108, each of which are being paged to trigger an uplink report.

Alternative 1: The wireless access node 106 (e.g., BSS 106) can then transmit an IA message 125 (assigning uplink packet resources) that includes one or more instances of the full 32-bit MSIDs of the IoT devices 108 that are intended to be triggered along with a trigger condition indication. Additional information to complete the assignment of uplink packet resources is transmitted using a subsequent ATI message 127, for which only the intended IoT device 108 will be waiting to receive.

Alternative 2: The wireless access node 106 (e.g., BSS 106) can then transmit an IA message 125' (assigning uplink packet resources) that includes one or more instances of reduced MSIDs (e.g., the least significant 16 bits of the full MSID) of the IoT devices 108 that are intended to be triggered along with a trigger condition indication. In this case, the remaining bits of each of the intended 32-bit MSIDs are transmitted using a subsequent ATI message 127', thereby allowing all unintended IoT devices 108 (not shown) to determine that they were not targeted and that they are to remain in Idle mode.

Each IA message 125 and 125' and ATI message 127 and 127' may be repeated multiple times depending on the worst of the coverage classes associated with the IoT devices 108 addressed by these messages.

The wireless access node 106 (e.g., BSS 106) transmits the IA messages 125 and 125' using the nominal paging group common to the set of IoT devices 108 to which the wireless access node 106 (e.g., BSS 106) is attempting to transmit a trigger indication. This means that the intended (triggered) IoT devices 108 are identified explicitly using an IA message 125 alone or a combination of the IA and ATI messages 125' and 127' that together include the full 32 bits of the MSID of the IoT devices 108 that are intended to be triggered to transmit reports.

The set of triggered IoT devices 108 use the assigned uplink resources to transmit their uplink reports 122 to the wireless access node 106 (e.g., BSS 106).

The advantage of this case over Paging Case 1 is that this case leverages the wireless access node 106 (or CN nodes 102 and 104) knowledge of IoT devices 108 that are stationary (e.g., limited to a specific cell), which means the RRC-related overhead can be reduced for the network triggered reporting use case (which is expected to be quite common) by eliminating the paging step and the subsequent RACH request to confirm the availability of the target IoT device 108 within a given cell.

Second Embodiment

The first CN node 102 (e.g., GGSN 102) can exchange capabilities with some nodes outside the 3GPP domain (e.g., the SCS 105), whereby it can be pre-determined that UDP/IP packets delivered to the first CN node 102 (e.g., GGSN 102) from a given UDP Source Port number, for which a given range of UDP Destination Port numbers are included, will always be associated with Network Triggered Reporting events. That is, this can serve as the means by which the first CN node 102 (e.g., GGSN 102) of the first embodiment can determine which UDP Destination Port numbers in the private range are to be interpreted as implicitly indicating a network triggered report is to be requested of a given IoT device 108. Once this exchange of capabilities occurs between the first CN node 102 (e.g., GGSN 102) and a given node (e.g., the SCS 105) outside the 3GPP domain, then the mechanism for delivering network triggers to IoT devices 108 can be managed as described above with respect to the first embodiment of the present disclosure.

Third Embodiment

The IoT device 108 can use Non-Access Stratum (NAS) signaling as a means to include the UDP source port (e.g., the UDP source port number) and the UDP destination port (e.g., the UDP destination port number) values that are to be interpreted as indicating that the first CN node 102 (e.g., GGSN 102) is to determine that the purpose of the IP packet 103 is to notify the IoT device 108 of Network Triggered Reporting.

An example of NAS signaling is PDP Context Activation which involves signaling between the IoT device 108 and the second CN node 104 (e.g., SGSN 104), where the second CN node 104 (e.g., SGSN 104) is thereby triggered to perform supplementary PDP Context Activation related signaling with the first CN node 102 (e.g., GGSN 102). Thereafter, the supplementary PDP Context Activation related signaling between the first and second CN nodes 102 and 104 can include the aforementioned UDP source port (e.g., the UDP source port number) and the UDP destination port (e.g., the UDP destination port number) values sent from the IoT device 108 to the second CN node 104 (e.g., SGSN 104) during the PDP Context Activation related signaling.

The Protocol Configuration Options information element is an example of an information element conveyed from the IoT device 108 to the second CN node 104 (e.g., SGSN 104) during PDP Context Activation signaling that can be enhanced per this embodiment to support the inclusion of the UDP source port and UDP destination port values, which can then be relayed to the first CN node 102 (e.g., GGSN 102) during the supplementary PDP Context Activation related signaling performed between the first and second CN nodes 102 and 104.

Another possible NAS procedure that could be used to convey UDP source port and UDP destination port values from the IoT device 108 to the first CN node 102 (via the second CN node 104) is the GPRS Attach signaling.

Fourth Embodiment

The PDP Context Activation procedure is used as a means for a given IoT device 108 to inform the second CN node 104 (e.g., SGSN 104) that the reception of any IP packet for the given IoT device 108 that has a payload that is less than a threshold of X octets (e.g., X=10) is to be considered as a network triggered report notification.

For example, the Protocol Configuration Options information element is an information element conveyed from the IoT device 108 to the second CN node 104 (e.g., SGSN 104) during PDP Context Activation signaling that can be enhanced to support the inclusion of this "X octet threshold" information.

The second CN node 104 (e.g., SGSN 104) can then, optionally, relay this "X octet threshold" information to the first CN node 102 (e.g., GGSN 102) during the supplementary PDP Context Activation related signaling performed between the first and second CN nodes 102 and 104 as part of the PDP Context Activation procedure. Then, the CN node 102 (e.g., GGSN 102) upon the reception of any IP packet for the given IoT device 108 that has a payload that is less than a threshold of X octets (e.g., X=10) can consider this IP packet as a network triggered report notification. However, this is not strictly necessary since the second CN node 104 (e.g., SGSN 104) can perform IP packet analysis and thereby determine if any given IP packet addressed to a target IoT device 108 that has indicated an "X octet threshold" value contains a network triggered report notification without any assistance from the first CN node 102 (e.g., GGSN 102).

This embodiment allows IP packets having a payload size that is not less than (i.e., is equal to or exceeds) X octets to be delivered to the IoT device 108 using legacy procedures (i.e., the full IP packet will be delivered to the target IoT device 108).

Referring to FIG. 2, there is a flowchart of a method 200 implemented in the first CN node 102 (e.g., GGSN 102) in accordance with the present disclosure. At step 202, the first CN node 102 (e.g., GGSN 102) receives the IP packet 103 originated by the external node 105 (e.g., SCS 105, MTC server). At step 204, the first CN node 102 (e.g., GGSN 102) determines that the IP packet 103 includes information to trigger the IoT device 108 to perform a certain action (e.g., transmit a specific type of report, start and stop of measurements). A more detailed explanation about how this method 200 can be performed with respect to different embodiments is provided next with respect to FIGS. 3, 4, 5A and 5B.

Referring to FIG. 3, there is a flowchart of a method 300 implemented in the first CN node 102 (e.g., GGSN 102) in accordance with one embodiment of the present disclosure. At step 302, the first CN node 102 (e.g., GGSN 102) interacts with a node (e.g., SCS 105, MTC server) outside a domain of the first CN node 102 to obtain a UDP source port number and a given range of UDP destination port numbers which are to be associated with network triggered reporting events for the IoT device 108. At step 304, the first CN node 102 (e.g., GGSN 102) receives the IP packet 103 originated by the external node 105 (e.g., SCS 105, MTC server). At step 306, the first CN node 102 (e.g., GGSN 102) determines that the IP packet 103 includes information to trigger the IoT device 108 to perform a certain action (i.e., transmit a specific type of report to the external node 105). In one example, the first CN node 102 (e.g., GGSN 102) performs step 306 by: (1) extracting UDP port information from the IP packet 103 (step 306*a*); (2) determining from the extracted UDP port information a UDP source port number and a UDP destination port number, wherein the UDP source port number indicates a network triggered report request and the UDP destination port number indicates a specific type of report (step 306*b*); and (3) comparing the UDP source port number and the UDP destination port numbers obtained during step 302 to the determined UDP source port number and UDP destination port number obtained during step 306*b* to determine that the IP packet 103 includes information to trigger the IoT device 108 to transmit a specific type of report to the external node 105 (step 306*c*). After step 306, the first CN node 102 (e.g., GGSN 102) can perform either step 308*a* or step 308*b*. At step 308*a*, the first CN node 102 (e.g., GGSN 102) transmits to the second CN node 104 (e.g., SGSN 104) the IP packet 103 which identifies the IoT device 108 and includes the network triggered report information 107, wherein the network triggered report information 107 comprises the specific type of report requested from the identified IoT device 108. Alternatively, the first CN node 102 (e.g., GGSN 102) at step 308*b* transmits to the second CN node 104 (e.g., SGSN 104) the control plane message 111 which comprises an identity 109 of the IoT device 108 and network triggered report information 107, wherein the network triggered report information 107 comprises the specific type of report requested from the identified IoT device 108.

Figure 4:
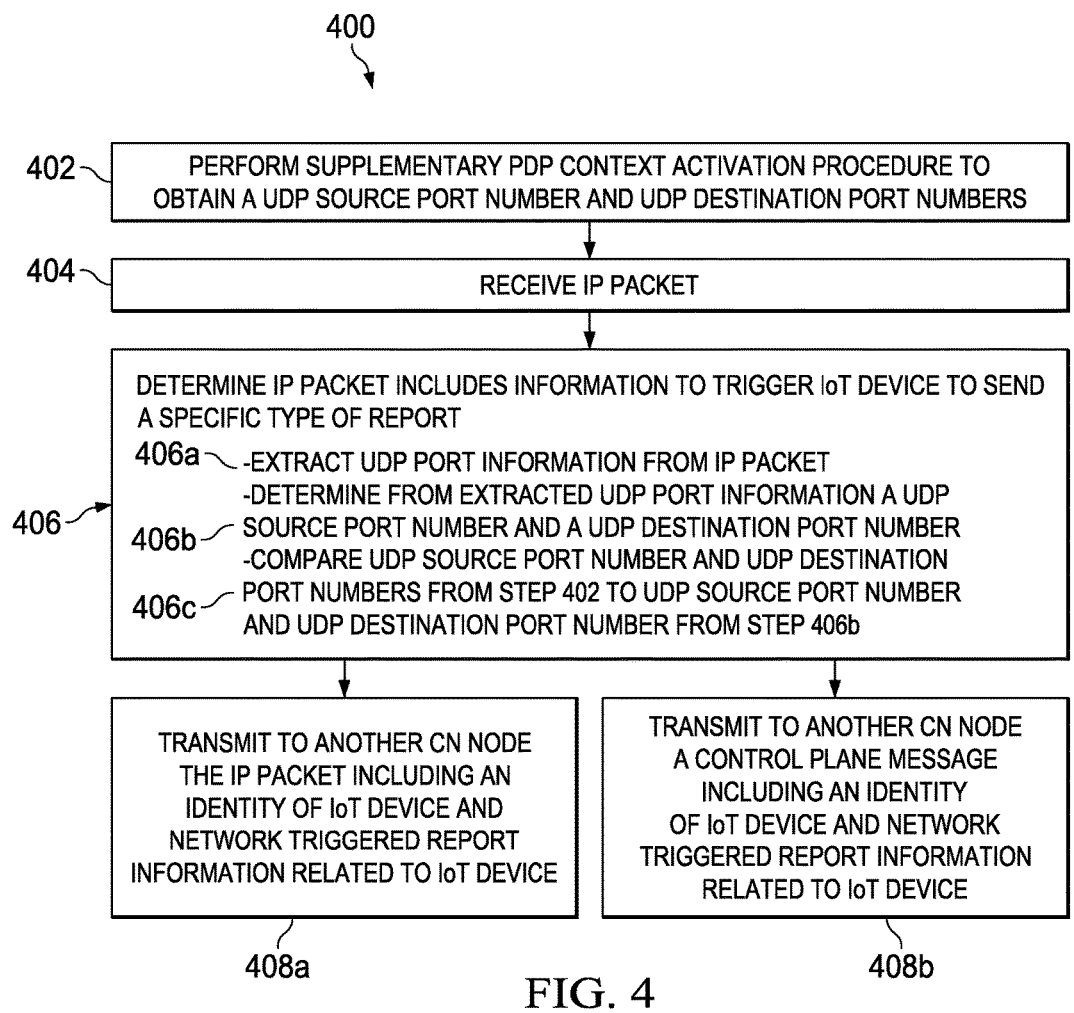
FIG. 4 is a flowchart of a method implemented in the first CN node (e.g., GGSN) in accordance with another embodiment of the present disclosure.

Referring to FIG. 4, there is a flowchart of a method 400 implemented in the first CN node 102 (e.g., GGSN 102) in accordance with another embodiment of the present disclosure. At step 402, the first CN node 102 (e.g., GGSN 102) performs a supplementary PDP Context Activation procedure with the second CN node 104 (e.g., SGSN 104) during which the first CN node 102 (e.g., GGSN 102) receives from the second CN node 104 (e.g., SGSN 104) information associated with the IoT device 108 including a UDP source port number and a range of UDP destination port numbers that are to be used by the first CN node 102 (e.g., GGSN 102) while performing the subsequent step 406. At step 404, the first CN node 102 (e.g., GGSN 102) receives the IP packet 103 originated by the external node 105 (e.g., SCS 105, MTC server). At step 406, the first CN node 102 (e.g., GGSN 102) determines that the IP packet 103 includes information to trigger the IoT device 108 to perform a certain action (i.e., transmit a specific type of report to the external node 105). In one example, the first CN node 102 (e.g., GGSN 102) performs step 406 by: (1) extracting UDP port information from the IP packet 103 (step 406*a*); (2) determining from the extracted UDP port information a UDP source port number and a UDP destination port number, wherein the UDP source port number indicates a network triggered report request and the UDP destination port number indicates a specific type of report (step 406*b*); and (3) comparing the UDP source port number and the UDP destination port numbers obtained during step 402 to the determined UDP source port number and UDP destination port number obtained during step 406*b* to determine that the IP packet 103 includes information to trigger the IoT device 108 to transmit a specific type of report to the external node 105 (step 406*c*). After step 406, the first CN node 102 (e.g., GGSN 102) can perform either step 408*a* or step 408*b*. At step 408*a*, the first CN node 102 (e.g., GGSN 102) transmits to second CN node 104 (e.g., SGSN 104) the IP packet 103 which identifies the IoT device 108 and includes the network triggered report information 107, wherein the network triggered report information 107 comprises the specific type of report requested from the identified IoT device 108. Alternatively, the first CN node 102 (e.g., GGSN 102) at step 408*b* transmits to the second CN node 104 (e.g., SGSN 104) the control plane message 111 which comprises an identity 109 of the IoT device 108 and network triggered report information 107, wherein the network triggered report information 107 comprises the specific type of report requested from the identified IoT device 108.

Figure 5A:
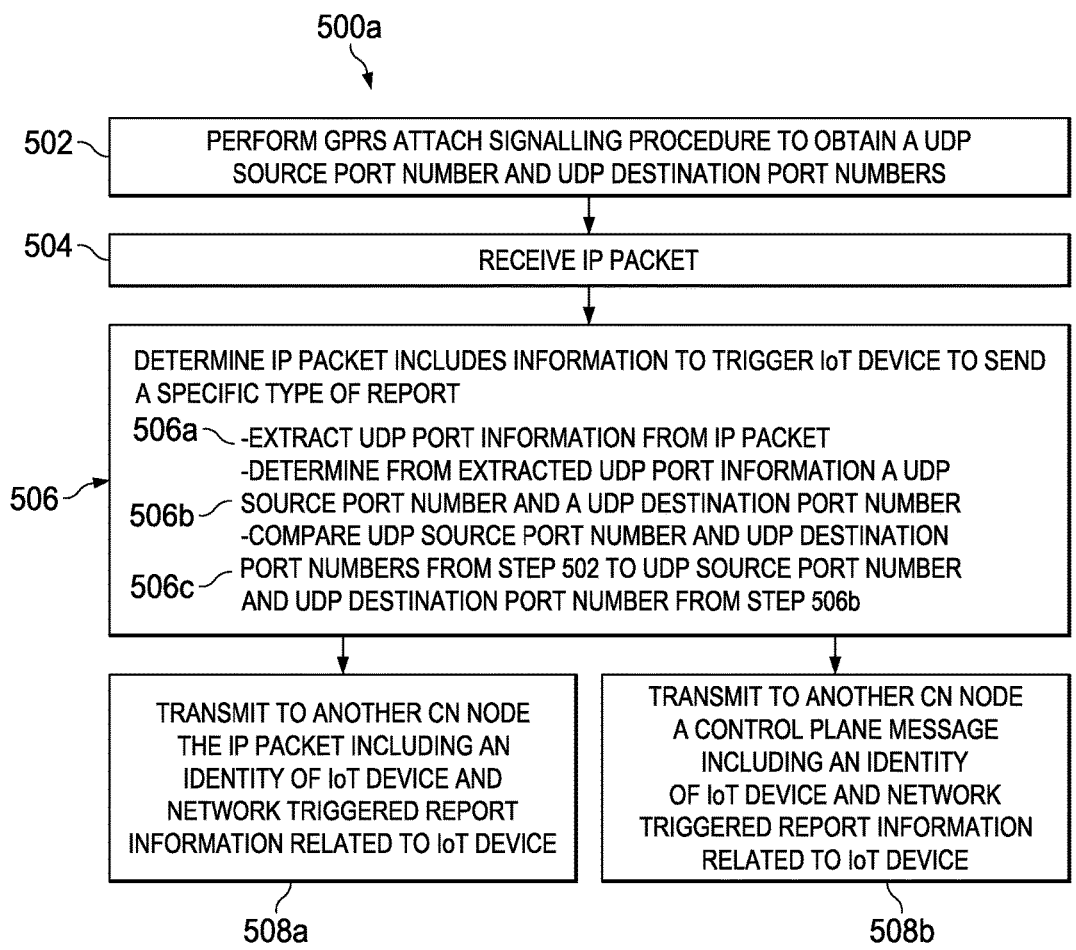
FIG. 5A is a flowchart of a method implemented in the first CN node (e.g., GGSN) in accordance with yet another embodiment of the present disclosure.

Referring to FIG. 5A, there is a flowchart of a method 500*a* implemented in the first CN node 102 (e.g., GGSN 102) in accordance with yet another embodiment of the present disclosure. At step 502, the first CN node 102 (e.g., GGSN 102) performs a GPRS Attach signaling procedure with the second CN node 104 (e.g., SGSN 104) during which the first CN node 102 (e.g., GGSN 102) receives from the second CN node 104 (e.g., SGSN 104) information associated with the IoT device 108 including a UDP source port number and a range of UDP destination port numbers that are to be used by the first CN node 102 (e.g., GGSN 102) while performing the subsequent step 506. At step 504, the first CN node 102 (e.g., GGSN 102) receives the IP packet 103 originated by the external node 105 (e.g., SCS 105, MTC server). At step 506, the first CN node 102 (e.g., GGSN 102) determines that the IP packet 103 includes information to trigger the IoT device 108 to perform a certain action (i.e., transmit a specific type of report to the external node 105). In one example, the first CN node 102 (e.g., GGSN 102) performs step 506 by: (1) extracting UDP port information from the IP packet 103 (step 506*a*); (2) determining from the extracted UDP port information a UDP source port number and a UDP destination port number, wherein the UDP source port number indicates a network triggered report request and the UDP destination port number indicates a specific type of report (step 506*b*); and (3) comparing the UDP source port number and the UDP destination port numbers obtained during step 402 to the determined UDP source port number and UDP destination port number obtained during step 406*b* to determine that the IP packet 103 includes information to trigger the IoT device 108 to transmit a specific type of report to the external node 105 (step 506*c*). After step 506, the first CN node 102 (e.g., GGSN 102) can perform either step 508*a* or step 508*b*. At step 508*a*, the first CN node 102 (e.g., GGSN 102) transmits to second CN node 104 (e.g., SGSN 104) the IP packet 103 which identifies the IoT device 108 and includes the network triggered report information 107, wherein the network triggered report information 107 comprises the specific type of report requested from the identified IoT device 108. Alternatively, the first CN node 102 (e.g., GGSN 102) at step 508*b* transmits to the second CN node 104 (e.g., SGSN 104) the control plane message 111 which comprises an identity 109 of the IoT device 108 and network triggered report information 107, wherein the network triggered report information 107 comprises the specific type of report requested from the identified IoT device 108.

Referring to FIG. 5B, there is a flowchart of a method 500*b* implemented in the first CN node 102 (e.g., GGSN 102) in accordance with another embodiment of the present disclosure. At step 510, the first CN node 102 (e.g., GGSN 102) performs a supplementary PDP Context Activation procedure with the second CN node 104 (e.g., SGSN 104) during which the first CN node 102 (e.g., GGSN 102) is informed that when the first CN node 102 (e.g., GGSN 102) receives an IP packet that is associated with the IoT device 108 and has a payload that is less than a threshold of X octets then that IP packet is to be considered as a trigger for the IoT device 108 to perform the certain action (e.g., transmit a specific type of report, start and stop of measurements) (it is to be noted that the second CN node 104 (e.g., SGSN 104) obtains the X octet threshold from the IoT device 108 during the PDP Context Activation Procedure). At step 512, the first CN node 102 (e.g., GGSN 102) receives the IP packet 103 originated by the external node 105 (e.g., SCS 105, MTC server). At step 514, the first CN node 102 (e.g., GGSN 102) determines that the IP packet 103 includes information to trigger the IoT device 108 to perform a certain action (i.e., transmit a specific type of report to the external node 105). In particular, the first CN node 102 (e.g., GGSN 102) performs step 514 by determining whether the received IP packet 103 has a payload that is less than the threshold of X octets obtained during step 510. If the result of step 514 is yes, the first CN node 102 (e.g., GGSN 102) at step 516 transmits to the second CN node 104 (e.g., SGSN 104) the IP packet 103 or the control plan message 111 which identifies the IoT device 108 and includes the network triggered report information 107. If the result of step 514 is no, the first CN node 102 (e.g., GGSN 102) at step 518 transmits to the second CN node 104 (e.g., SGSN 104) the IP packet 103 which identifies the IoT device 108 but does not include the network triggered report information 107.

Referring to FIG. 6, there is a block diagram illustrating structures of an exemplary first CN node 102 (e.g., GGSN 102) configured in accordance with the present disclosure. In one embodiment, the first CN node 102 (e.g., GGSN 102) may comprise a receive module 602 and a determine module 604. The receive module 602 is configured to receive the IP packet 103 originated by the external node 105 (e.g., SCS 105, MTC server). The determine module 604 is configured to determine that the IP packet 103 includes information to trigger the IoT device 108 to perform a certain action (e.g., transmit a specific type of report, start and stop of measurements).

As those skilled in the art will appreciate, the above-described modules 602 and 604 of the first CN node 102 (e.g., GGSN 102) may be implemented separately as suitable dedicated circuits. Further, the modules 602 and 604 can also be implemented using any number of dedicated circuits through functional combination or separation. In some embodiments, the modules 602 and 604 may be even combined in a single application specific integrated circuit (ASIC). As an alternative software-based implementation, the first CN node 102 (e.g., GGSN 102) may comprise the processing module 606 which includes a memory 608, and a processor 610 (including but not limited to a microprocessor, a microcontroller or a Digital Signal Processor (DSP), etc.) (see FIG. 1). The memory 608 stores machine-readable program code executable by the processor 610 to cause the first CN node 102 (e.g., GGSN 102) to perform the steps of the above-described method 200. It should be appreciated that the first CN node 102 (e.g., GGSN 102) also includes many other well-known components, but for clarity, only the components needed to describe the features of the present disclosure are described herein.

Referring to FIG. 7, there is a block diagram illustrating structures of an exemplary first CN node 102 (e.g., GGSN 102) configured in accordance with an embodiment of the present disclosure. In one embodiment, the first CN node 102 (e.g., GGSN 102) may comprise an obtain module 702, a receive module 704, a determine module 706, a first transmit module 708, and a second transmit module 710. The obtain module 702 is configured to interact with a node (e.g., SCS 105, MTC server) outside a domain of the first CN node 102 to obtain a UDP source port number and a given range of UDP destination port numbers which are associated with network triggered reporting events for the IoT device 108. The receive module 704 is configured to receive the IP packet 103 originated by the external node 105 (e.g., SCS 105, MTC server). The determine module 706 is configured to determine that the IP packet 103 includes information to trigger the IoT device 108 to perform a certain action (i.e., transmit a specific type of report to the external node 105). In one example, the determine module 706 is configured to (1) extract UDP port information from the IP packet 103; (2) determine from the extracted UDP port information a UDP source port number and a UDP destination port number, wherein the UDP source port number indicates a network triggered report request and the UDP destination port number indicates a specific type of report; and (3) compare the UDP source port number and the UDP destination port numbers obtained by the obtain module 702 to the determined UDP source port number and UDP destination port number obtained by the determine module 706 to determine that the IP packet 103 includes information to trigger the IoT device 108 to transmit a specific type of report to the external node 105. The first transmit module 708 is configured to transmit to the second CN node 104 (e.g., SGSN 104) the IP packet 103 which identifies the IoT device 108 and includes the network triggered report information 107, wherein the network triggered report information 107 comprises the specific type of report requested from the identified IoT device 108. Alternatively, the second transmit module 710 is configured to transmit to the second CN node 104 (e.g., SGSN 104) the control plane message 111 which comprises an identity 109 of the IoT device 108 and network triggered report information 107, wherein the network triggered report information 107 comprises the specific type of report requested from the identified IoT device 108. As those skilled in the art will appreciate, the above-described modules 702, 704, 706, 708 and 710 of the first CN node 102 (e.g., GGSN 102) may be implemented separately as suitable dedicated circuits. Further, the modules 702, 704, 706, 708 and 710 can also be implemented using any number of dedicated circuits through functional combination or separation. In some embodiments, the modules 702, 704, 706, 708 and 710 may be even combined in a single application specific integrated circuit (ASIC). As an alternative software-based implementation, the first CN node 102 (e.g., GGSN 102) may comprise the processing module 606 which includes a memory 608, and a processor 610 (including but not limited to a microprocessor, a microcontroller or a Digital Signal Processor (DSP), etc.) (see FIG. 1). The memory 608 stores machine-readable program code executable by the processor 610 to cause the first CN node 102 (e.g., GGSN 102) to perform the steps of the above-described method 300. It should be appreciated that the first CN node 102 (e.g., GGSN 102) also includes many other well-known components, but for clarity, only the components needed to describe the features of the present disclosure are described herein.

Referring to FIG. 8, there is a block diagram illustrating structures of an exemplary first CN node 102 (e.g., GGSN 102) configured in accordance with another embodiment of the present disclosure. In one embodiment, the first CN node 102 (e.g., GGSN 102) may comprise a perform module 802, a receive module 804, a determine module 806, a first transmit module 808, and a second transmit module 810. The perform module 802 is configured to perform a Supplementary PDP Context Activation procedure with the second CN node 104 (e.g., SGSN 104) to receive from the second CN node 104 (e.g., SGSN 104) information associated with the IoT device 108 including a UDP source port number and a range of UDP destination port numbers which are associated with network triggered reporting events for the IoT device 108. The receive module 804 is configured to receive the IP packet 103 originated by the external node 105 (e.g., SCS 105, MTC server). The determine module 806 is configured to determine that the IP packet 103 includes information to trigger the IoT device 108 to perform a certain action (i.e., transmit a specific type of report to the external node 105). In one example, the determine module 806 is configured to (1) extract UDP port information from the IP packet 103; (2) determine from the extracted UDP port information a UDP source port number and a UDP destination port number, wherein the UDP source port number indicates a network triggered report request and the UDP destination port number indicates a specific type of report; and (3) compare the UDP source port number and the UDP destination port numbers obtained by the perform module 802 to the determined UDP source port number and UDP destination port number obtained by the determine module 806 to determine that the IP packet 103 includes information to trigger the IoT device 108 to transmit a specific type of report to the external node 105. The first transmit module 808 is configured to transmit to the second CN node 104 (e.g., SGSN 104) the IP packet 103 which identifies the IoT device 108 and includes the network triggered report information 107, wherein the network triggered report information 107 comprises the specific type of report requested from the identified IoT device 108. Alternatively, the second transmit module 810 is configured to transmit to the second CN node 104 (e.g., SGSN 104) the control plane message 111 which comprises an identity 109 of the IoT device 108 and network triggered report information 107, wherein the network triggered report information 107 comprises the specific type of report requested from the identified IoT device 108.

As those skilled in the art will appreciate, the above-described modules 802, 804, 806, 808 and 810 of the first CN node 102 (e.g., GGSN 102) may be implemented separately as suitable dedicated circuits. Further, the modules 802, 804, 806, 808 and 810 can also be implemented using any number of dedicated circuits through functional combination or separation. In some embodiments, the modules 802, 804, 806, 808 and 810 may be even combined in a single application specific integrated circuit (ASIC). As an alternative software-based implementation, the first CN node 102 (e.g., GGSN 102) may comprise the processing module 606 which includes a memory 608, and a processor 610 (including but not limited to a microprocessor, a microcontroller or a Digital Signal Processor (DSP), etc.) (see FIG. 1). The memory 608 stores machine-readable program code executable by the processor 610 to cause the first CN node 102 (e.g., GGSN 102) to perform the steps of the above-described method 400. It should be appreciated that the first CN node 102 (e.g., GGSN 102) also includes many other well-known components, but for clarity, only the components needed to describe the features of the present disclosure are described herein.

Referring to FIG. 9A, there is a block diagram illustrating structures of an exemplary first CN node 102 (e.g., GGSN 102) configured in accordance with yet another embodiment of the present disclosure. In one embodiment, the first CN node 102 (e.g., GGSN 102) may comprise a perform module 902, a receive module 904, a determine module 906, a first transmit module 908, and a second transmit module 910. The perform module 902 is configured to perform a GPRS Attach signaling procedure with the second CN node 104 (e.g., SGSN 104) to receive from the second CN node 104 (e.g., SGSN 104) information associated with the IoT device 108 including a UDP source port number and a range of UDP destination port numbers which are associated with network triggered reporting events for the IoT device 108. The receive module 904 is configured to receive the IP packet 103 originated by the external node 105 (e.g., SCS 105, MTC server). The determine module 906 is configured to determine that the IP packet 103 includes information to trigger the IoT device 108 to perform a certain action (i.e., transmit a specific type of report to the external node 105). In one example, the determine module 906 is configured to (1) extract UDP port information from the IP packet 103; (2) determine from the extracted UDP port information a UDP source port number and a UDP destination port number, wherein the UDP source port number indicates a network triggered report request and the UDP destination port number indicates a specific type of report; and (3) compare the UDP source port number and the UDP destination port numbers which were obtained by the perform module 902 to the determined UDP source port number and UDP destination port number obtained by the determine module 906 to determine that the IP packet 103 includes information to trigger the IoT device 108 to transmit a specific type of report to the external node 105. The first transmit module 908 is configured to transmit to the second CN node 104 (e.g., SGSN 104) the IP packet 103 which identifies the IoT device 108 and includes the network triggered report information 107, wherein the network triggered report information 107 comprises the specific type of report requested from the identified IoT device 108. Alternatively, the second transmit module 910 is configured to transmit to the second CN node 104 (e.g., SGSN 104) the control plane message 111 which comprises an identity 109 of the IoT device 108 and network triggered report information 107, wherein the network triggered report information 107 comprises the specific type of report requested from the identified IoT device 108.

As those skilled in the art will appreciate, the above-described modules 902, 904, 906, 908 and 910 of the first CN node 102 (e.g., GGSN 102) may be implemented separately as suitable dedicated circuits. Further, the modules 902, 904, 906, 908 and 910 can also be implemented using any number of dedicated circuits through functional combination or separation. In some embodiments, the modules 902, 904, 906, 908 and 910 may be even combined in a single application specific integrated circuit (ASIC). As an alternative software-based implementation, the first CN node 102 (e.g., GGSN 102) may comprise the processing module 606 which includes a memory 608, and a processor 610 (including but not limited to a microprocessor, a microcontroller or a Digital Signal Processor (DSP), etc.) (see FIG. 1). The memory 608 stores machine-readable program code executable by the processor 610 to cause the first CN node 102 (e.g., GGSN 102) to perform the steps of the above-described method 500*a*. It should be appreciated that the first CN node 102 (e.g., GGSN 102) also includes many other well-known components, but for clarity, only the components needed to describe the features of the present disclosure are described herein.

Referring to FIG. 9B, there is a block diagram illustrating structures of an exemplary first CN node 102 (e.g., GGSN 102) configured in accordance with yet another embodiment of the present disclosure. In one embodiment, the first CN node 102 (e.g., GGSN 102) may comprise a perform module 911, a receive module 912, a determine module 914, a first transmit module 916, and a second transmit module 918. The perform module 911 is configured to perform a supplementary PDP Context Activation procedure with the second CN node 104 (e.g., SGSN 104) during which the first CN node 102 (e.g., GGSN 102) is informed that when the first CN node 102 (e.g., GGSN 102) receives an IP packet that is associated with the IoT device 108 and has a payload that is less than a threshold of X octets then that IP packet is to be considered as a trigger for the IoT device 108 to perform the certain action (e.g., transmit a specific type of report, start and stop of measurements) (it is to be noted that the second CN node 104 (e.g., SGSN 104) obtains the X octet threshold from the IoT device 108 during the PDP Context Activation Procedure). The receive module 914 is configured to receive the IP packet 103 originated by the external node 105 (e.g., SCS 105, MTC server). The determine module 914 is configured to determine that the IP packet 103 includes information to trigger the IoT device 108 to perform a certain action (i.e., transmit a specific type of report to the external node 105). In particular, the determine module 914 is configured to make this determination by determining whether the received IP packet 103 has a payload that is less than the threshold of X octets obtained by the perform module 911. If the received IP packet 103 has a payload that is less than the threshold of X octets, the first transmit module 916 is configured to transmit to the second CN node 104 (e.g., SGSN 104) the IP packet 103 or the control plan message 111 which identifies the IoT device 108 and includes the network triggered report information 107. If the received IP packet 103 has a payload greater than the threshold of X octets, the second transmit module 918 is configured to transmit to the second CN node 104 (e.g., SGSN 104) the IP packet 103.

As those skilled in the art will appreciate, the above-described modules 911, 912, 914, 916 and 918 of the first CN node 102 (e.g., GGSN 102) may be implemented separately as suitable dedicated circuits. Further, the modules 911, 912, 914, 916 and 918 can also be implemented using any number of dedicated circuits through functional combination or separation. In some embodiments, the modules 911, 912, 914, 916 and 918 may be even combined in a single application specific integrated circuit (ASIC). As an alternative software-based implementation, the first CN node 102 (e.g., GGSN 102) may comprise the processing module 606 which includes a memory 608, and a processor 610 (including but not limited to a microprocessor, a microcontroller or a Digital Signal Processor (DSP), etc.) (see FIG. 1). The memory 608 stores machine-readable program code executable by the processor 610 to cause the first CN node 102 (e.g., GGSN 102) to perform the steps of the above-described method 500*b*. It should be appreciated that the first CN node 102 (e.g., GGSN 102) also includes many other well-known components, but for clarity, only the components needed to describe the features of the present disclosure are described herein.

Figure 10:
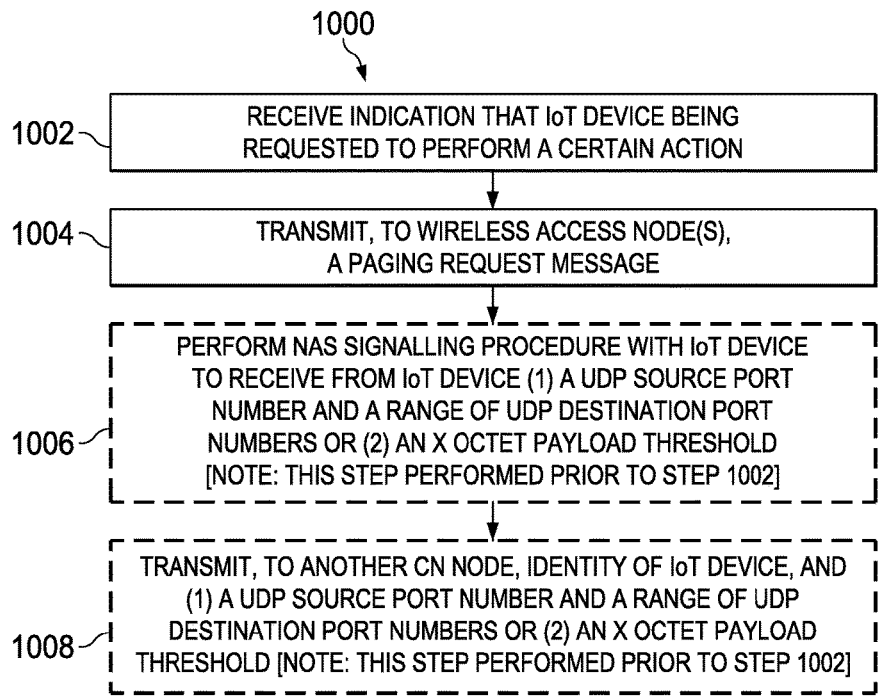
FIG. 10 is a flowchart of a method implemented in the second CN node (e.g., SGSN) in accordance with the present disclosure.

Referring to FIG. 10, there is a flowchart of a method 1000 implemented in the second CN node 104 (e.g., SGSN 104) in accordance with the present disclosure. At step 1002, the second CN node 104 (e.g., SGSN 104) receives from the first CN node 102 (e.g., GGSN 102) an indication 103, 103/107 and 111 that the IoT device 108 is being requested to perform a certain action (e.g., transmit a specific type of report, start and stop of measurements). For instance, the indication 103, 103/107 and 111 can be: (1) an IP packet 103 originated by an external node 105 (e.g., SCS 105, MTC server); (2) an IP packet 103 which identifies the IoT device 108 and includes the network triggered report information 107, wherein the network triggered report information 107 comprises the specific type of report requested from the identified IoT device 108; and (3) a control plane message 111 which comprises an identity 109 of the IoT device 108 and network triggered report information 107, wherein the network triggered report information 107 comprises the specific type of report requested from the identified IoT device 108. At step 1004, the second CN node 104 (e.g., SGSN 104) transmits to at least one wireless access node 106 (e.g., BSS 106) the paging request message 113 in response to receiving the indication 103, 103/107 and 111. The paging request message 113 indicates that the IoT device 108 is being requested to perform the certain action (e.g., transmit a specific type of report, start and stop of measurements). For example, the paging request message 113 can be one of the following: (1) a legacy paging request message modified to include a new information element that indicates the IoT device 108 is being requested to transmit the specific type of report to the external node 105 (e.g., SCS 105, MTC server); (2) a legacy paging request message modified to indicate that the IoT device 108 is being requested to transmit the specific type of report to the external node 105 (e.g., SCS 105, MTC server); and (3) a new paging request message that supports network triggered reporting. At step 1006 (optional), the second CN node 104 (e.g., SGSN 104) performs before step 1002 a NAS signaling procedure with the IoT device 108 to receive from the IoT device 108 either (1) a UDP source port number and a range of UDP destination port numbers or (2) an X octet payload threshold. At step 1008 (optional), the second CN node 104 (e.g., SGSN 104) before step 1002 transmits, to the first CN node 102 (e.g., GGSN 102) an identity of the IoT device 108 and either (1) the UDP source port number, and the range of UDP destination port numbers (e.g., see FIG. 4 for discussion on how the first CN node 102 (e.g., GGSN 102) utilizes this information) or (2) the X octet payload threshold. A more detailed explanation about how this method 1000 can be performed in accordance with different embodiments is provided next with respect to FIGS. 11 and 12.

Figure 11:
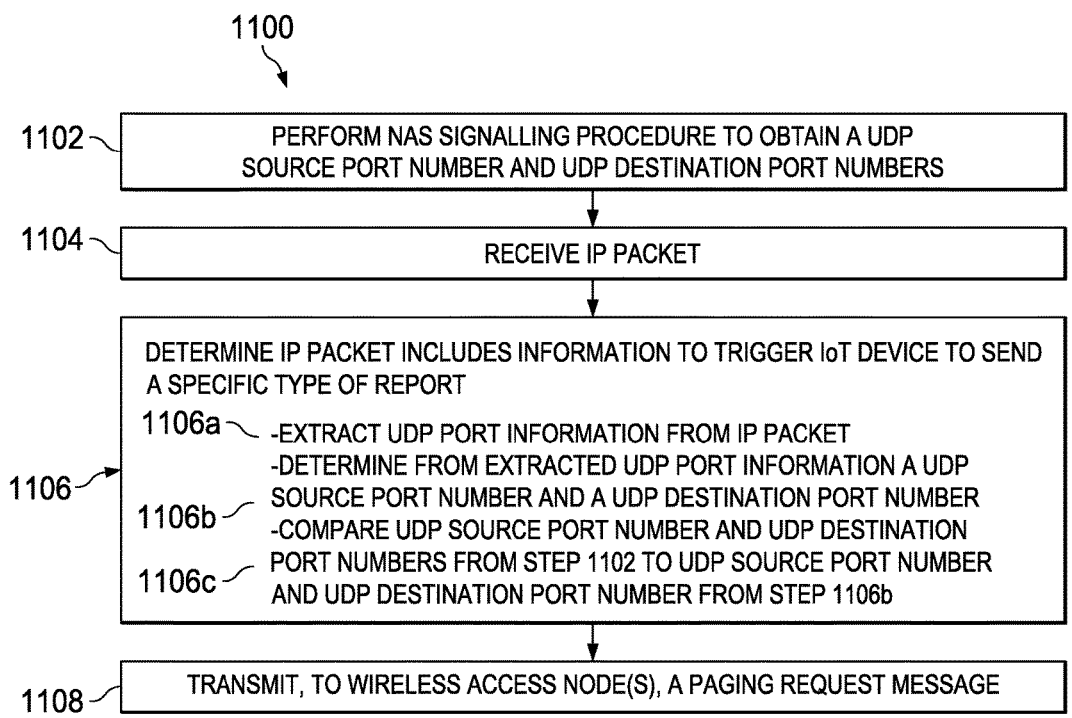
FIG. 11 is a flowchart of a method implemented in the second CN node (e.g., SGSN) in accordance with one embodiment of the present disclosure.

Referring to FIG. 11, there is a flowchart of a method 1100 implemented in the second CN node 104 (e.g., SGSN 104) in accordance with one embodiment of the present disclosure. At step 1102, the second CN node 104 (e.g., SGSN 104) performs a NAS signaling procedure (e.g., PDP Context Activation procedure) with the IoT device 108 during which the second CN node 104 (e.g., SGSN 104) receives from the IoT device 108 a UDP source port number and a range of UDP destination port numbers that will be used by the second CN node 104 (e.g., SGSN 104) while performing the subsequent step 1106. At step 1104, the second CN node 104 (e.g., SGSN 104) receives from first CN node 102 (e.g., GGSN 102) the IP packet 103 which was originated by the external node 105 (e.g., SCS 105, MTC server). At step 1106, the second CN node 104 (e.g., SGSN 104) determines that the IP packet 103 includes information to trigger the IoT device 108 to perform a certain action (i.e., transmit a specific type of report to the external node 105). In one example, the second CN node 104 (e.g., SGSN 104) performs step 1106 by: (1) extracting UDP port information from the IP packet 103 (step 1106*a*); (2) determining from the extracted UDP port information a UDP source port number and a UDP destination port number, wherein the UDP source port number indicates a network triggered report request and the UDP destination port number indicates a specific type of report (step 1106*b*); and (3) comparing the UDP source port number and the UDP destination port numbers obtained during step 1102 to the determined UDP source port number and UDP destination port number obtained during step 1106*b* to determine that the IP packet 103 includes information to trigger the IoT device 108 to transmit the specific type of report to the external node 105 (step 1106*c*). At step 1108, the second CN node 104 (e.g., SGSN 104) transmits to at least one wireless access node 106 (e.g., BSS 106) the paging request message 113 in response to determining that the IP packet 103 includes information to trigger the IoT device 108 to transmit a specific type of report to the external node 105.

Figure 12:
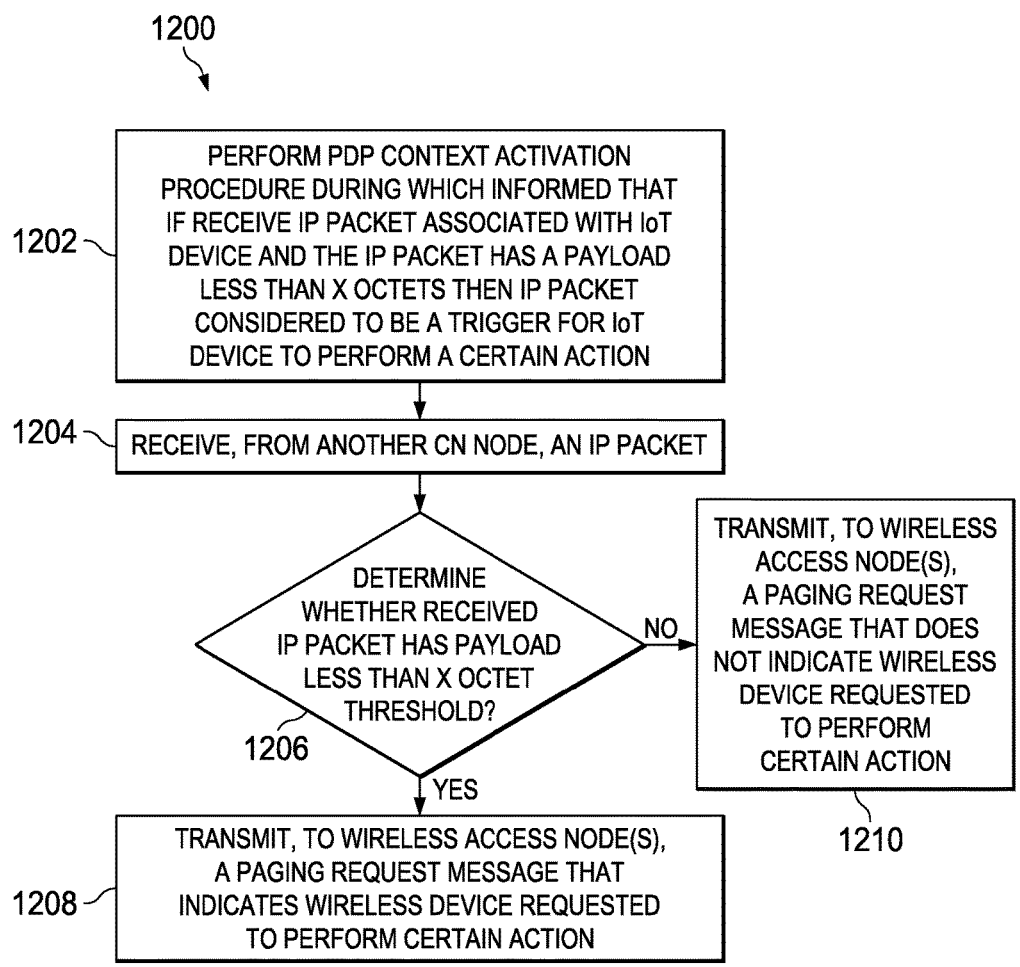
FIG. 12 is a flowchart of a method implemented in the second CN node (e.g., SGSN) in accordance with another embodiment of the present disclosure.

Referring to FIG. 12, there is a flowchart of a method 1200 implemented in the second CN node 104 (e.g., SGSN 104) in accordance with another embodiment of the present disclosure. At step 1202, the second CN node 104 (e.g., SGSN 104) performs a PDP Context Activation procedure with the IoT device 108 during which the second CN node 104 (e.g., SGSN 104) is informed that when the second CN node 104 (e.g., SGSN 104) receives an IP packet that is associated with the IoT device 108 and has a payload that is less than a threshold of X octets then that IP packet is to be considered as a trigger for the IoT device 108 to perform the certain action (e.g., transmit a specific type of report, start and stop of measurements). At step 1204, the second CN node 104 (e.g., SGSN 104) receives from the first CN node 102 (e.g., GGSN 102) the IP packet 103 which was originated by the external node 105 (e.g., SCS 105, MTC server). At step 1206, the second CN node 104 (e.g., SGSN 104) determines whether the received IP packet 103 has a payload that is less than the threshold of X octets. If the result of step 1206 is yes, the second CN node 104 (e.g., SGSN 104) at step 1208 transmits to at least one wireless access node 106 (e.g., BSS 106) a paging request message 113 which indicates the IoT device 108 is being requested to perform the certain action. If the result of step 1206 is no, the second CN node 104 (e.g., SGSN 104) at step 1210 transmits to the at least one wireless access node 106 (e.g., BSS 106) a paging request message 113 which does not indicate that the IoT device 108 is being requested to perform the certain action and after this the IP packet 103 which was originated by the external node 105 (e.g., SCS 105, MTC server) is subsequently delivered to the IoT device 108 using legacy procedures.

Figure 13:
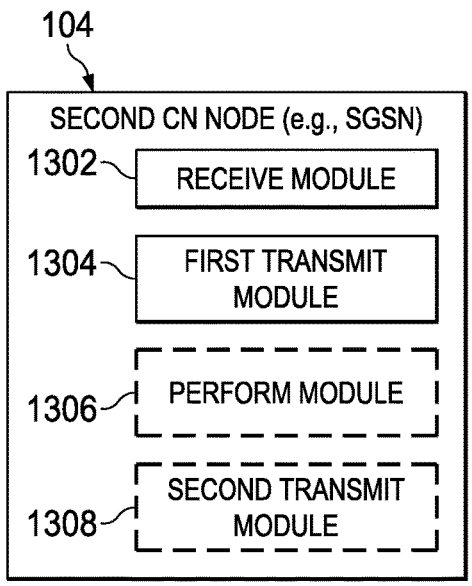
FIG. 13 is a block diagram illustrating structures of an exemplary second CN node (e.g., SGSN) configured in accordance with the present disclosure.

Referring to FIG. 13, there is a block diagram illustrating structures of an exemplary second CN node 104 (e.g., SGSN 104) configured in accordance with the present disclosure. In one embodiment, the second CN node 104 (e.g., SGSN 104) may comprise a receive module 1302, a first transmit module 1304, a perform module 1306, and a second transmit module 1308. The receive module 1302 is configured to receive from the first CN node 102 (e.g., GGSN 102) an indication 103, 103/107 and 111 that the IoT device 108 is being requested to perform a certain action (e.g., transmit a specific type of report, start and stop of measurements). For instance, the indication 103, 103/107 and 111 can be: (1) an IP packet 103 originated by an external node 105 (e.g., SCS 105, MTC server); (2) an IP packet 103 which identifies the IoT device 108 and includes the network triggered report information 107, wherein the network triggered report information 107 comprises the specific type of report requested from the identified IoT device 108; and (3) a control plane message 111 which comprises an identity 109 of the IoT device 108 and network triggered report information 107, wherein the network triggered report information 107 comprises the specific type of report requested from the identified IoT device 108. The first transmit module 1304 is configured to transmit to at least one wireless access node 106 (e.g., BSS 106) the paging request message 113 in response to receiving the indication 103, 103/107 and 111. The paging request message 113 indicates the IoT device 108 is being requested to perform the certain action (e.g., transmit a specific type of report, start and stop of measurements). For example, the paging request message 113 can be one of the following: (1) a legacy paging request message modified to include a new information element that indicates the IoT device 108 is being requested to transmit the specific type of report to the external node 105 (e.g., SCS 105, MTC server); (2) a legacy paging request message modified to indicate that the IoT device 108 is being requested to transmit the specific type of report to the external node 105 (e.g., SCS 105, MTC server); and (3) a new paging request message that supports network triggered reporting. The perform module 1306 (optional) is configured to perform a NAS signaling procedure with the IoT device 108 to receive from the IoT device 108 either (1) a UDP source port number and a range of UDP destination port numbers or (2) an X octet payload threshold. The second transmit module 1308 (optional) is configured to transmit to the first CN node 102 (e.g., GGSN 102) an identity of the IoT device 108 and either (1) the UDP source port number, and the range of UDP destination port numbers (e.g., see FIG. 8 for discussion on how the first CN node 102 (e.g., GGSN 102) utilizes this information) or (2) the X octet payload threshold.

As those skilled in the art will appreciate, the above-described modules 1302, 1304, 1306 and 1308 of the second CN node 104 (e.g., SGSN 104) may be implemented separately as suitable dedicated circuits. Further, the modules 1302, 1304, 1306 and 1308 can also be implemented using any number of dedicated circuits through functional combination or separation. In some embodiments, the modules 1302, 1304, 1306 and 1308 may be even combined in a single application specific integrated circuit (ASIC). As an alternative software-based implementation, the second CN node 104 (e.g., SGSN 104) may comprise the processing module 1310 which includes a memory 1312, and a processor 1314 (including but not limited to a microprocessor, a microcontroller or a Digital Signal Processor (DSP), etc.) (see FIG. 1). The memory 1312 stores machine-readable program code executable by the processor 1314 to cause the second CN node 104 (e.g., SGSN 104) to perform the steps of the above-described method 1000. It should be appreciated that the second CN node 104 (e.g., SGSN 104) also includes many other well-known components, but for clarity, only the components needed to describe the features of the present disclosure are described herein.

Figure 14:
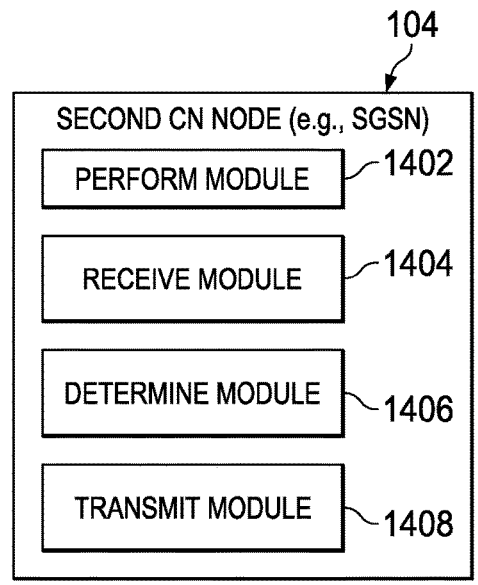
FIG. 14 is a block diagram illustrating structures of an exemplary second CN node (e.g., SGSN) configured in accordance with an embodiment of the present disclosure.

Referring to FIG. 14, there is a block diagram illustrating structures of an exemplary second CN node 104 (e.g., SGSN 104) configured in accordance with an embodiment of the present disclosure. In one embodiment, the second CN node 104 (e.g., SGSN 104) may comprise a perform module 1402, a receive module 1404, a determine module 1406, and a transmit module 1408. The perform module 1402 is configured to perform a NAS signaling procedure (e.g., PDP Context Activation procedure) with the IoT device 108 during which the second CN node 104 (e.g., SGSN 104) receives from the IoT device 108 a UDP source port number and a range of UDP destination port numbers that are to be used by the determine module 1406. The receive module 1404 is configured to receive from first CN node 102 (e.g., GGSN 102) the IP packet 103 which was originated by the external node 105 (e.g., SCS 105, MTC server). The determine module 1406 is configured to determine that the IP packet 103 includes information to trigger the IoT device 108 to perform a certain action (i.e., transmit a specific type of report to the external node 105). In one example, the determine module 1406 is configured to: (1) extract UDP port information from the IP packet 103; (2) determine from the extracted UDP port information a UDP source port number and a UDP destination port number, wherein the UDP source port number indicates a network triggered report request and the UDP destination port number indicates a specific type of report; and (3) compare the UDP source port number and the UDP destination port numbers obtained by the perform module 1402 to the determined UDP source port number and UDP destination port number obtained by the determine module 1406 to determine that the IP packet 103 includes information to trigger the IoT device 108 to transmit the specific type of report to the external node 105. The transmit module 1408 is configured to transmit to at least one wireless access node 106 (e.g., BSS 106) the paging request message 113 in response to determining that the IP packet 103 includes information to trigger the IoT device 108 to transmit a specific type of report to the external node 105.

As those skilled in the art will appreciate, the above-described modules 1402, 1404, 1406 and 1408 of the second CN node 104 (e.g., SGSN 104) may be implemented separately as suitable dedicated circuits. Further, the modules 1402, 1404, 1406 and 1408 can also be implemented using any number of dedicated circuits through functional combination or separation. In some embodiments, the modules 1402, 1404, 1406 and 1408 may be even combined in a single application specific integrated circuit (ASIC). As an alternative software-based implementation, the second CN node 104 (e.g., SGSN 104) may comprise the processing module 1310 which includes a memory 1312, and a processor 1314 (including but not limited to a microprocessor, a microcontroller or a Digital Signal Processor (DSP), etc.) (see FIG. 1). The memory 1312 stores machine-readable program code executable by the processor 1314 to cause the second CN node 104 (e.g., SGSN 104) to perform the steps of the above-described method 1100. It should be appreciated that the second CN node 104 (e.g., SGSN 104) also includes many other well-known components, but for clarity, only the components needed to describe the features of the present disclosure are described herein.

Figure 15:
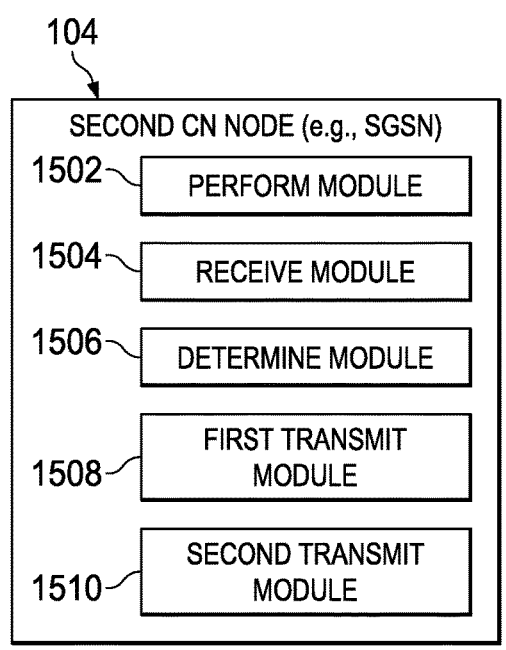
FIG. 15 is a block diagram illustrating structures of an exemplary second CN node (e.g., SGSN) configured in accordance with another embodiment of the present disclosure.

Referring to FIG. 15, there is a block diagram illustrating structures of an exemplary second CN node 104 (e.g., SGSN 104) configured in accordance with another embodiment of the present disclosure. In one embodiment, the second CN node 104 (e.g., SGSN 104) may comprise a perform module 1502, a receive module 1504, a determine module 1506, a first transmit module 1508, and a second transmit module 1510. The perform module 1502 is configured to perform a PDP Context Activation procedure with the IoT device 108 during which the second CN node 104 (e.g., SGSN 104) is informed that when the second CN node 104 (e.g., SGSN 104) receives an IP packet that is associated with the IoT device 108 and has a payload that is less than a threshold of X octets then that IP packet is to be considered as a trigger for the IoT device 108 to perform the certain action (e.g., transmit a specific type of report, start and stop of measurements). The receive module 1504 is configured to receive from the first CN node 102 (e.g., GGSN 102) the IP packet 103 which was originated by the external node 105 (e.g., SCS 105, MTC server). The determine module 1506 is configured to determine whether the received IP packet 103 has a payload that is less than the threshold of X octets. If yes, the first transmit module 1508 is configured to transmit to at least one wireless access node 106 (e.g., BSS 106) a paging request message 113 which indicates the IoT device 108 is being requested to perform the certain action. If the result is no, the second transmit module 1510 is configured to transmit to the at least one wireless access node 106 (e.g., BSS 106) a paging request message 113 which does not indicate that the IoT device 108 is being requested to perform the certain action and after which the IP packet 103 which was originated by the external node 105 (e.g., SCS 105, MTC server) is subsequently delivered to the IoT device 108 using legacy procedures.

As those skilled in the art will appreciate, the above-described modules 1502, 1504, 1506, 1508 and 1512 of the second CN node 104 (e.g., SGSN 104) may be implemented separately as suitable dedicated circuits. Further, the modules 1502, 1504, 1506, 1508 and 1512 can also be implemented using any number of dedicated circuits through functional combination or separation. In some embodiments, the modules 1502, 1504, 1506, 1508 and 1512 may be even combined in a single application specific integrated circuit (ASIC). As an alternative software-based implementation, the second CN node 104 (e.g., SGSN 104) may comprise the processing module 1310 which includes a memory 1312, and a processor 1314 (including but not limited to a microprocessor, a microcontroller or a Digital Signal Processor (DSP), etc.) (see FIG. 1). The memory 1312 stores machine-readable program code executable by the processor 1314 to cause the second CN node 104 (e.g., SGSN 104) to perform the steps of the above-described method 1200. It should be appreciated that the second CN node 104 (e.g., SGSN 104) also includes many other well-known components, but for clarity, only the components needed to describe the features of the present disclosure are described herein.

Figure 16:
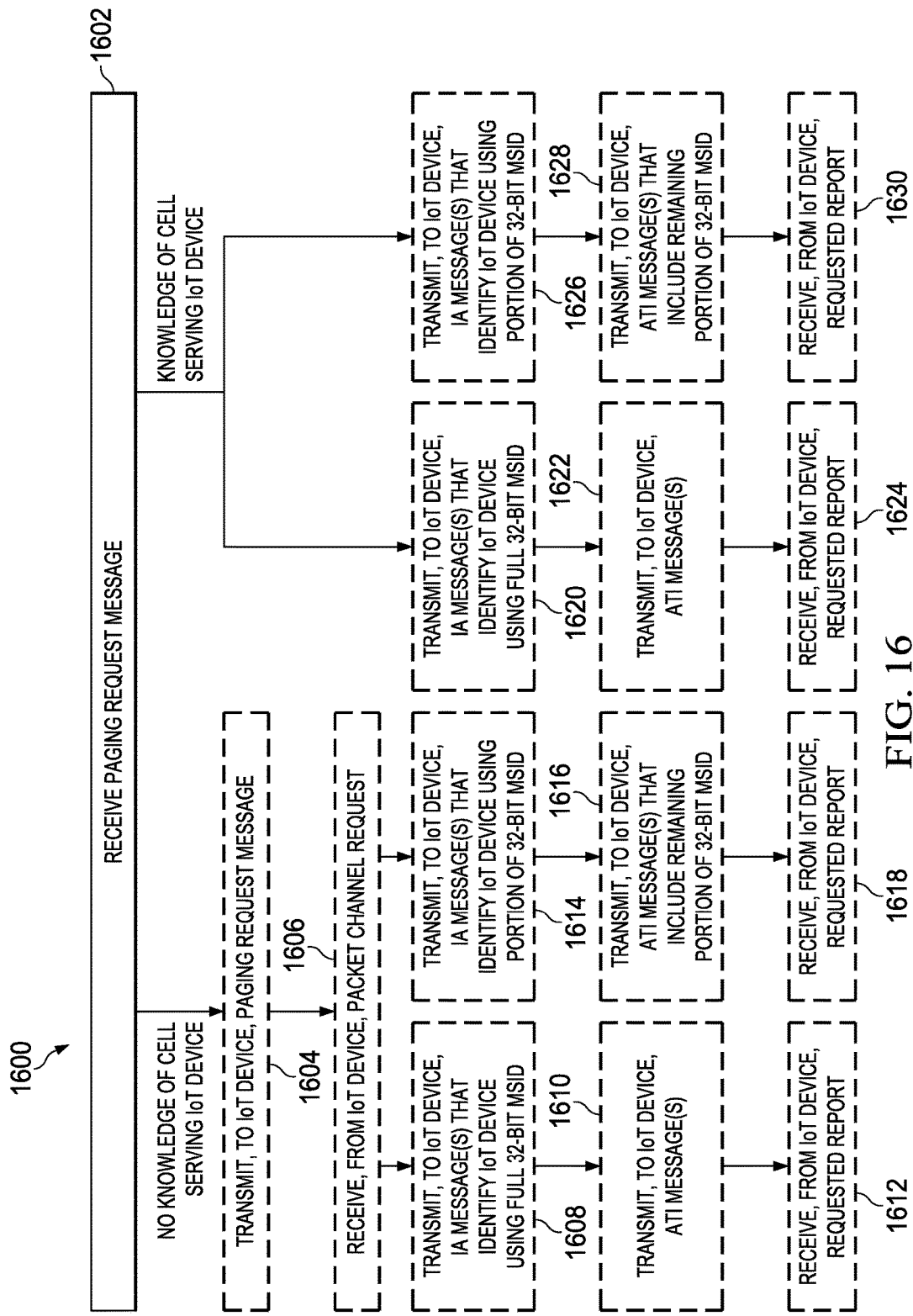
FIG. 16 is a flowchart of a method implemented in the wireless access node (e.g., BSS) in accordance with the present disclosure.

Referring to FIG. 16, there is a flowchart of a method 1600 implemented in the wireless access node 106 (e.g., BSS 106) in accordance with the present disclosure. At step 1602, the wireless access node 106 (e.g., BSS 106) receives from the second CN node 104 (e.g., SGSN 104) a paging request message 113 which (1) indicates the IoT device 108 is being requested to perform a certain action (e.g., transmit a specific type of report, start and stop of measurements), and (2) identifies the IoT device 108 using a 32-bit Mobile Station Identifier (MSID). After step 1602, when the wireless access node 106 (e.g., BSS 106) does not have knowledge of a specific cell serving the IoT device 108 then the wireless access node 106 (e.g., BSS 106) performs steps 1604 and 1606 and then either steps 1608, 1610 and 1612 or steps 1614, 1616 and 1618. At step 1604, the wireless access node 106 (e.g., BSS 106) transmits to the IoT device 108 another paging request message 115 which (1) indicates the IoT device 108 is being requested to perform the certain action (e.g., transmit a specific type of report, start and stop of measurements), and (2) identifies the IoT device 108 using a portion of the 32-bit MSID. At step 1606, the wireless access node 106 (e.g., BSS 106) receives from the IoT device 108 a packet channel request 117. After step 1606, the wireless access node 106 (e.g., BSS 106) can in one embodiment perform steps 1608, 1610 and 1612 or in another embodiment perform steps 1614, 616 and 618. At step 1608, the wireless access node 106 (e.g., BSS 106) transmits to the IoT device 108 one or more repeated Immediate Assignment (IA) messages 119 each of which (1) assigns at least a portion of uplink packet resources; (2) optionally indicates the IoT device 108 is being requested to perform the certain action; and (3) identifies the IoT device 108 using the full 32-bit MSID. At step 610, the wireless access node 106 (e.g., BSS 106) transmits to the IoT device 108 one or more repeated ATI messages 121 which complete the assignment of uplink packet resources. At step 612, the wireless access node 106 (e.g., BSS 106) receives from the IoT device 108 the requested report 122 (assuming this is the requested certain action). Alternatively, instead of performing steps 1608, 1610 and 1612, the wireless access node 106 (e.g., BSS 106) at step 614 transmits to the IoT device 108 one or more repeated IA messages 119' each of which (1) assigns at least a portion of uplink packet resources; (2) optionally indicates the IoT device 108 is being requested to perform a certain action (e.g., transmit a specific type of report, start and stop of measurements); and (3) identifies the IoT device 108 using a portion of the 32-bit MSID. At step 616, the wireless access node 106 (e.g., BSS 106) transmits to the IoT device 108 one or more repeated ATI messages 121' each of which includes at least a remaining portion of the 32-bit MSID. At step 618, the wireless access node 106 (e.g., BSS 106) receives from the IoT device 108 the requested report 122 (assuming this is the requested certain action).

Alternatively after step 1602, when the wireless access node 106 (e.g., BSS 106) does have knowledge of a specific cell serving the IoT device 108 then the wireless access node 106 (e.g., BSS 106) in one embodiment either perform steps 1620, 1622 and 1624 or in another embodiment perform steps 1626, 1628 and 1630. At step 1620, the wireless access node 106 (e.g., BSS 106) transmits to the IoT device 108 one or more repeated IA messages 125 each of which (1) assigns at least a portion of uplink packet resources; (2) indicates the IoT device 108 is being requested to perform the certain action (e.g., transmit a specific type of report, start and stop of measurements); and (3) identifies the IoT device 108 using the full 32-bit MSID. At step 1622, the wireless access node 106 (e.g., BSS 106) transmits to the IoT device 108 one or more repeated ATI messages 127 which complete the assignment of uplink packet resources. At step 624, the wireless access node 106 (e.g., BSS 106) receives from the IoT device 108 the requested report 122 (assuming this is the requested certain action). Or instead of performing steps 1620, 1622 and 1624, the wireless access node 106 (e.g., BSS 106) at step 1626 transmits to the IoT device 108 one or more repeated IA messages 125' each of which (1) assigns at least a portion of uplink packet resources; (2) indicates the IoT device 108 is being requested to perform a certain action (e.g., transmit a specific type of report, start and stop of measurements); and (3) identifies the IoT device 108 using a portion of the 32-bit MSID. At step 1628, the wireless access node 106 (e.g., BSS 106) transmits to the IoT device 108 one or more repeated ATI messages 127' each of which includes at least a remaining portion of the 32-bit MSID. At step 630, the wireless access node 106 (e.g., BSS 106) receives from the IoT device 108 the requested report 122 (assuming this is the requested certain action).

Figure 17:
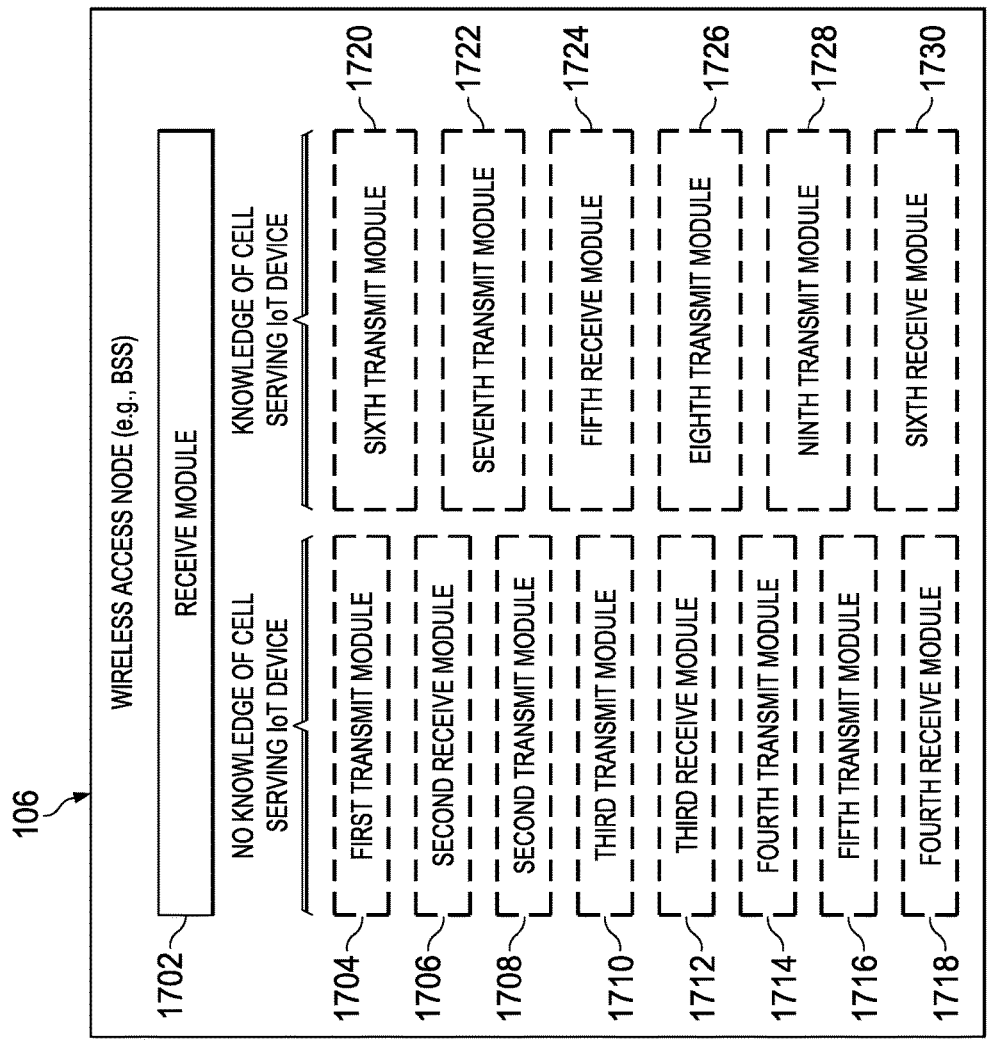
FIG. 17 is a block diagram illustrating structures of an exemplary wireless access node (e.g., BSS) configured in accordance with the present disclosure.

Referring to FIG. 17, there is a block diagram illustrating structures of an exemplary wireless access node 106 (e.g., BSS 106) configured in accordance with the present disclosure. In one embodiment, the wireless access node 106 (e.g., BSS 106) may comprise a first receive module 1702, a first transmit module 1704, a second receive module 1706, a second transmit module 1708, a third transmit module 1710, a third receive module 1712, a fourth transmit module 1714, a fifth transmit module 1716, a fourth receive module 1718, a sixth transmit module 1720, a seventh transmit module 1722, a fifth receive module 1724, an eighth transmit module 1726, a ninth transmit module 1728, and sixth receive module 1730.

The first receive module 1702 is configured to receive from the second CN node 104 (e.g., SGSN 104) a paging request message 113 which (1) indicates the IoT device 108 is being requested to perform a certain action (e.g., transmit a specific type of report, start and stop of measurements), and (2) identifies the IoT device 108 using a 32-bit Mobile Station Identifier (MSID).

The wireless access node 106 (e.g., BSS 106) utilizes the first transmit module 1704 and the second receive module 1706 and then either the second transmit module 1708, the third transmit module 1710, and the third receive module 1712, or the fourth transmit module 1714, the fifth transmit module 1716, and the fourth receive module 1718 when the wireless access node 106 (e.g., BSS 106) does not have knowledge of a specific cell serving the IoT device 108. The first transmit module 1704 is configured to transmit to the IoT device 108 another paging request message 115 which (1) indicates the IoT device 108 is being requested to perform the certain action (e.g., transmit a specific type of report, start and stop of measurements), and (2) identifies the IoT device 108 using a portion of the 32-bit MSID. The second receive module 1708 is configured to receive from the IoT device 108 a packet channel request 117. The wireless access node 106 (e.g., BSS 106) can in one embodiment utilize the second transmit module 1708, the third transmit module 1710, and the third receive module 1712 or in another embodiment utilize the fourth transmit module 1714, the fifth transmit module 1716, and the fourth receive module 1718. The second transmit module 1708 is configured to transmit to the IoT device 108 one or more repeated Immediate Assignment (IA) messages 119 each of which (1) assigns at least a portion of uplink packet resources; (2) optionally indicates the IoT device 108 is being requested to perform the certain action; and (3) identifies the IoT device 108 using the full 32-bit MSID. The third transmit module 1710 is configured to transmit to the IoT device 108 one or more repeated ATI messages 121 which complete the assignment of uplink packet resources. The third receive module 1712 is configured to receive from the IoT device 108 the requested report 122 (assuming this is the requested certain action). In the other embodiment, the fourth transmit module 1714 is configured to transmit to the IoT device 108 one or more repeated IA messages 119' each of which (1) assigns at least a portion of uplink packet resources; (2) optionally indicates the IoT device 108 is being requested to perform a certain action (e.g., transmit a specific type of report, start and stop of measurements); and (3) identifies the IoT device 108 using a portion of the 32-bit MSID. The fifth transmit module 1716 is configured to transmit to the IoT device 108 one or more repeated ATI messages 121' each of which includes at least a remaining portion of the 32-bit MSID. The fourth receive module 1718 is configured to receive from the IoT device 108 the requested report 122 (assuming this is the requested certain action).

Alternatively, the wireless access node 106 (e.g., BSS 106) utilizes in one embodiment either the sixth transmit module 1720, the seventh transmit module 1722, and the fifth receive module 1724, or in another embodiment the eighth transmit module 1726, the ninth transmit module 1728, and the sixth receive module 1730 when the wireless access node 106 (e.g., BSS 106) has knowledge of a specific cell serving the IoT device 108. The sixth transmit module 1720 is configured to transmit to the IoT device 108 one or more repeated IA messages 125 each of which (1) assigns at least a portion of uplink packet resources; (2) indicates the IoT device 108 is being requested to perform the certain action (e.g., transmit a specific type of report, start and stop of measurements); and (3) identifies the IoT device 108 using the full 32-bit MSID. The seventh transmit module 1722 is configured to transmit to the IoT device 108 one or more repeated ATI messages 127 which complete the assignment of uplink packet resources. The fifth receive module 1724 is configured to receive from the IoT device 108 the requested report 122 (assuming this is the requested certain action). In the other embodiment, the eighth transmit module 1726 is configured to transmit to the IoT device 108 one or more repeated IA messages 125' each of which (1) assigns at least a portion of uplink packet resources; (2) indicates the IoT device 108 is being requested to perform a certain action (e.g., transmit a specific type of report, start and stop of measurements); and (3) identifies the IoT device 108 using a portion of the 32-bit MSID. The ninth transmit module 1728 is configured to transmit to the IoT device 108 one or more repeated ATI messages 127' each of which includes at least a remaining portion of the 32-bit MSID. The sixth receive module 1730 is configured to receive from the IoT device 108 the requested report 122 (assuming this is the requested certain action).

As those skilled in the art will appreciate, the above-described modules 1702, 1704, 1706, 1708, 1710, 1712, 1714, 1718, 1720, 1722, 1724, 1726, 1728, and 1730 of the wireless access node 106 (e.g., BSS 106) may be implemented separately as suitable dedicated circuits. Further, the modules 1702, 1704, 1706, 1708, 1710, 1712, 1714, 1718, 1720, 1722, 1724, 1726, 1728, and 1730 can also be implemented using any number of dedicated circuits through functional combination or separation. In some embodiments, the modules 1702, 1704, 1706, 1708, 1710, 1712, 1714, 1718, 1720, 1722, 1724, 1726, 1728, and 1730 may be even combined in a single application specific integrated circuit (ASIC). As an alternative software-based implementation, the wireless access node 106 (e.g., BSS 106) may comprise the processing module 1732 which includes a memory 1734, and a processor 1736 (including but not limited to a microprocessor, a microcontroller or a Digital Signal Processor (DSP), etc.) (see FIG. 1). The memory 1734 stores machine-readable program code executable by the processor 1736 to cause the wireless access node 106 (e.g., BSS 106) to perform the steps of the above-described method 1600. It should be appreciated that the wireless access node 106 (e.g., BSS 106) also includes many other well-known components, but for clarity, only the components needed to describe the features of the present disclosure are described herein.

Figure 18:
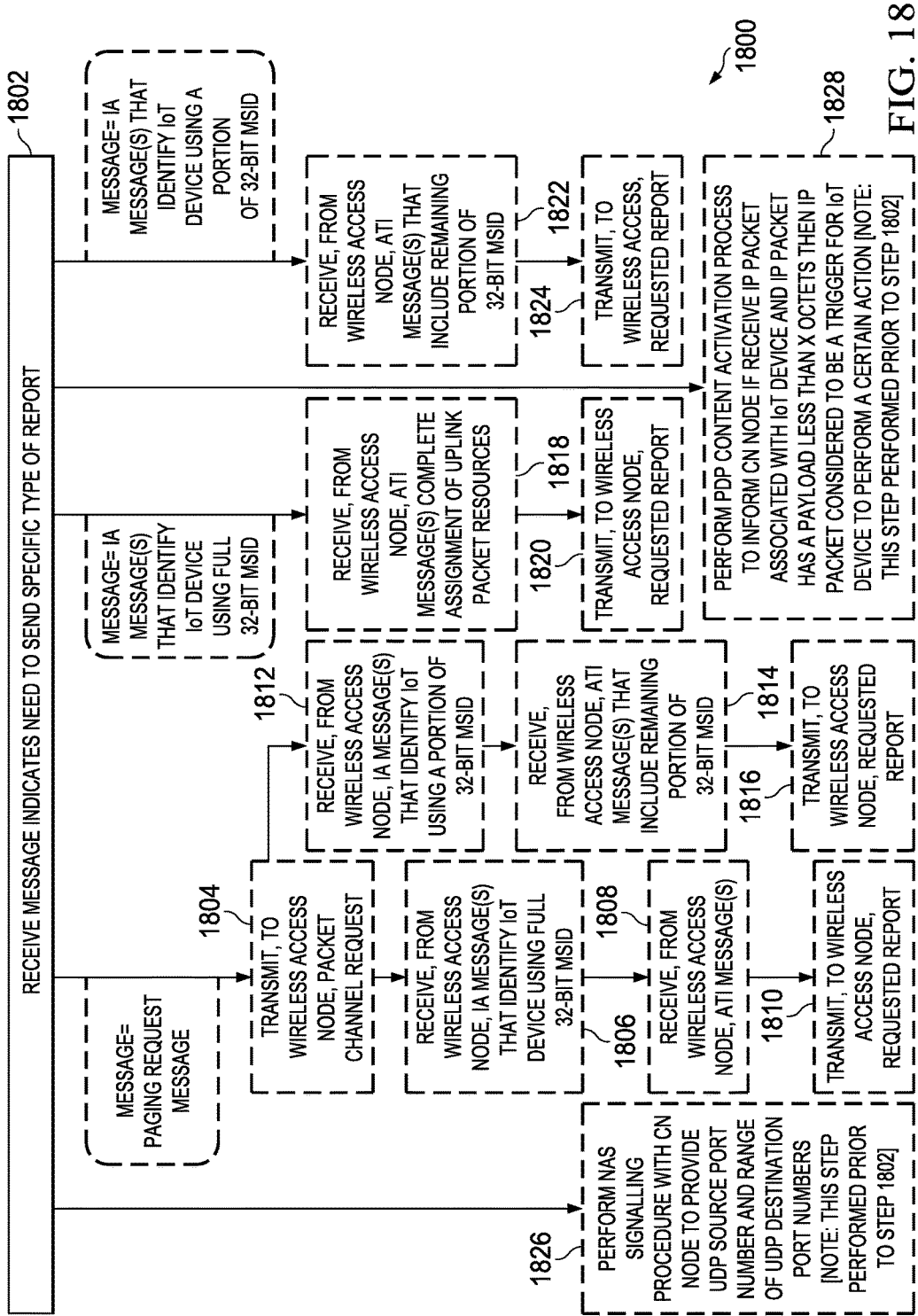
FIG. 18 is a flowchart of a method implemented in the wireless device (e.g., IoT device) in accordance with the present disclosure.

Referring to FIG. 18, there is a flowchart of a method 1800 implemented in the wireless device 108 (e.g., IoT device 108) in accordance with the present disclosure. At step 1802, the wireless device 108 (e.g., IoT device 108) receives from the wireless access node 106 (e.g., BSS 106) a message 115, 125 or 125' which indicates that the wireless device 108 (e.g., IoT device 108) is being requested to perform a certain action (e.g., transmit a specific type of report, start and stop of measurements). After step 1802, when the message 115, 125 or 125' is a paging request message 115 then the wireless device 108 (e.g., IoT device 108) can perform step 1804 and then in one embodiment perform steps 1806, 1808 and 1810 or in another embodiment perform steps 1812, 1814 and 1816. At step 1804, the wireless device 108 (e.g., IoT device 108) transmits to the wireless access node 106 (e.g., BSS 106) a packet channel request 117 in response to receiving the paging request message 115. In the one embodiment, the wireless device 108 (e.g., IoT device 108) at step 1806 receives from the wireless access node 106 (e.g., BSS 106) one or more repeated Immediate Assignment (IA) messages 119 each of which (1) assigns at least a portion of uplink packet resources; (2) optionally indicates the IoT device 108 is being requested to perform the certain action (e.g., transmit a specific type of report, start and stop of measurements); and (3) identifies the IoT device 108 using the full 32-bit MSID. At step 1808, the wireless device 108 (e.g., IoT device 108) receives from the wireless access node 106 (e.g., BSS 106) one or more repeated ATI messages 121 which complete the assignment of uplink packet resources. At step 1810, the wireless device 108 (e.g., IoT device 108) transmits to the wireless access node 106 (e.g., BSS 106) the requested report 122 (assuming this is the requested certain action). In the another embodiment, the wireless device 108 (e.g., IoT device 108) at step 1812 receives from the wireless access node 106 (e.g., BSS 106) one or more repeated IA messages 119' each of which (1) assigns at least a portion of uplink packet resources; (2) optionally indicates the IoT device 108 is being requested to perform a certain action (e.g., transmit a specific type of report, start and stop of measurements); and (3) identifies the IoT device 108 using a portion of the 32-bit MSID. At step 1814, the wireless device 108 (e.g., IoT device 108) receives from the wireless access node 106 (e.g., BSS 106) one or more repeated ATI messages 121' each of which includes at least a remaining portion of the 32-bit MSID. At step 1816, the wireless device 108 (e.g., IoT device 108) transmits to the wireless access node 106 (e.g., BSS 106) the requested report 122 (assuming this is the requested certain action).

Alternatively after step 1802, the wireless device 108 (e.g., IoT device 108) can perform steps 1818 and 1820 when the message 115, 125 or 125' is one or more repeated IA messages 125 where each of which (1) assigns at least a portion of uplink packet resources; (2) indicates the IoT device 108 is being requested to perform the certain action (e.g., transmit a specific type of report, start and stop of measurements); and (3) identifies the IoT device 108 using the full 32-bit MSID. At step 1818, the wireless device 108 (e.g., IoT device 108) receives from the wireless access node 106 (e.g., BSS 106) one or more repeated ATI messages 127 which complete the assignment of uplink packet resources. At step 1820, the wireless device 108 (e.g., IoT device 108) transmits to the wireless access node 106 (e.g., BSS 106) the requested report 122 (assuming this is the requested certain action).

Or after step 1802, the wireless device 108 (e.g., IoT device 108) can perform steps 1822 and 1824 when the message 115, 125 or 125' is one or more repeated IA messages 125' where each of which (1) assigns at least a portion of uplink packet resources; (2) indicates the IoT device 108 is being requested to perform a certain action (e.g., transmit a specific type of report, start and stop of measurements); and (3) identifies the IoT device 108 using a portion of the 32-bit MSID. At step 1822, the wireless device 108 (e.g., IoT device 108) receives from the wireless access node 106 (e.g., BSS 106) one or more repeated ATI messages 127' each of which includes at least a remaining portion of the 32-bit MSID. At step 1828, the wireless device 108 (e.g., IoT device 108) transmits to the wireless access node 106 (e.g., BSS 106) the requested report 122 (assuming this is the requested certain action).

In one case, the wireless device 108 (e.g., IoT device 108) before performing step 1802 can perform a NAS signaling procedure (e.g., PDP Context Activation procedure, GPRS Attach Signaling procedure) at step 1826 with the second CN node 104 (e.g., SGSN 104) to transmit to the second CN node 104 (e.g., SGSN 104) information associated with the IoT device 108 including a UDP source port number and a range of UDP destination port numbers (see FIGS. 4-5 and 11 for a detailed description on how this UDP port information is used by the first and second CN nodes 102 and 104).

In another case, the wireless device 108 (e.g., IoT device 108) before performing step 1802 can perform a PDP Context Activation procedure at step 1828 with the second CN node 104 (e.g., SGSN 104) to inform the second CN node 104 (e.g., SGSN 104) that when it receives an IP packet that is associated with the IoT device 108 and the IP packet has a payload that is less than a threshold of X octets then that IP packet is to be considered as a trigger for the IoT device 108 to perform a certain action (e.g., transmit a specific type of report, start and stop of measurements) (see FIG. 12 for a detailed description on how this information is used by the second CN node 104 (e.g., SGSN 104).

Figure 19:
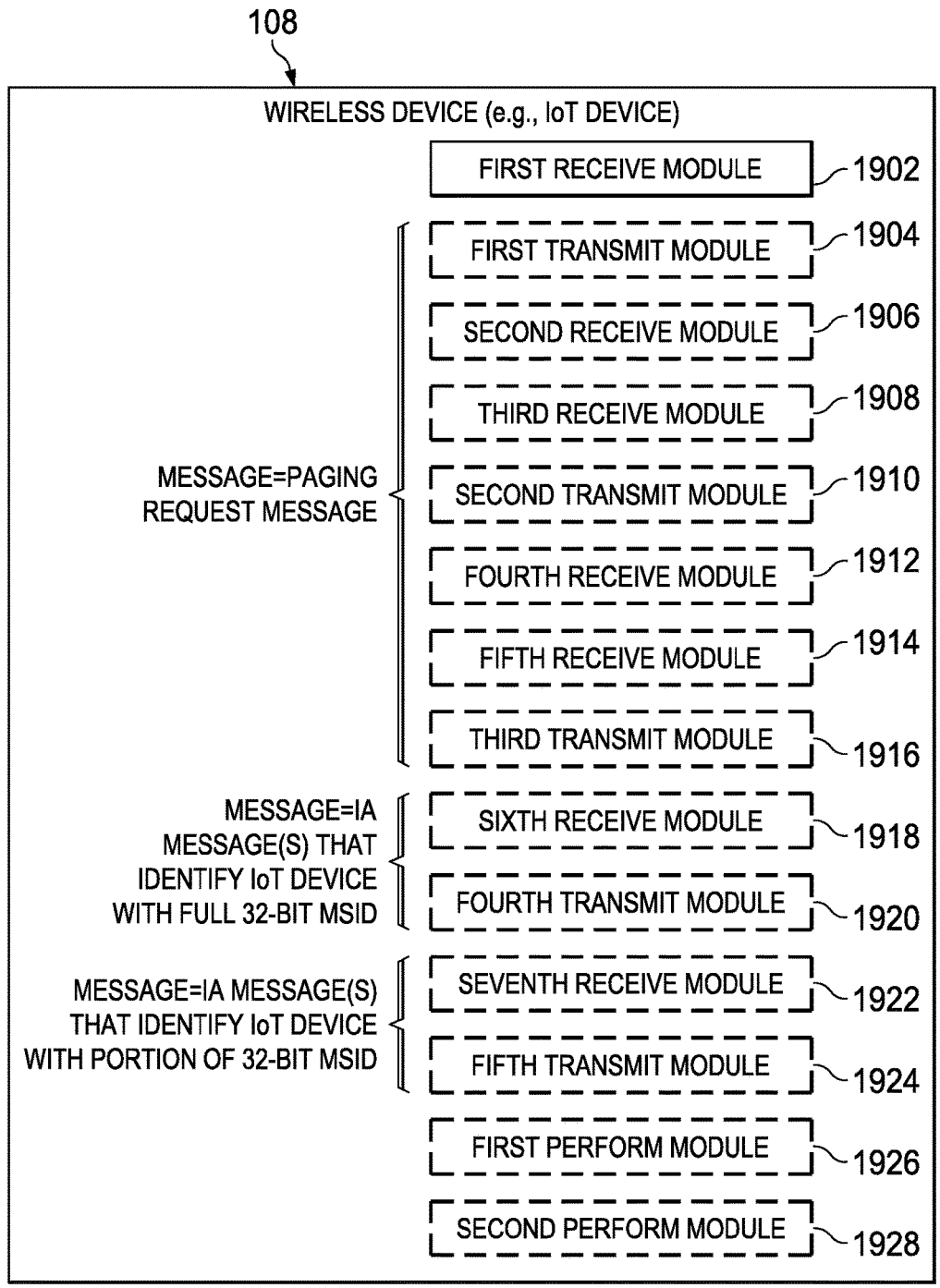
FIG. 19 is a block diagram illustrating structures of an exemplary wireless device (e.g., IoT device) configured in accordance with the present disclosure.

Referring to FIG. 19, there is a block diagram illustrating structures of an exemplary wireless device 108 (e.g., IoT device 108) configured in accordance with the present disclosure. In one embodiment, the wireless device 108 (e.g., IoT device 108) may comprise a first receive module 1902, a first transmit module 1904, a second receive module 1906, a third receive module 1908, a second transmit module 1910, a fourth receive module 1912, a fifth receive module 1914, a third transmit module 1916, a sixth receive module 1918, a fourth transmit module 1920, a seventh receive module 1922, a fifth transmit module 1924, a first perform module 1926, and a second perform module 1928.

The first receive module 1902 is configured to receive from the wireless access node 106 (e.g., BSS 106) a message 115, 125 or 125' which indicates that the wireless device 108 (e.g., IoT device 108) is being requested to perform a certain action (e.g., transmit a specific type of report, start and stop of measurements). At this point, when the message 115, 125 or 125' is a paging request message 115 then the wireless device 108 (e.g., IoT device 108) can utilize the first transmit module 1904 and then in one embodiment utilize the second receive module 1906, the third receive module 1908 and the second transmit module 1910 or in another embodiment utilize the fourth receive module 1912, the fifth receive module 1914, and the third transmit module 1916. The first transmit module 1904 is configured to transmit to the wireless access node 106 (e.g., BSS 106) a packet channel request 117 in response to receiving the paging request message 115. In the one embodiment, the second receive module 1906 is configured to receive from the wireless access node 106 (e.g., BSS 106) one or more repeated Immediate Assignment (IA) messages 119 each of which (1) assigns at least a portion of uplink packet resources; (2) optionally indicates the IoT device 108 is being requested to perform the certain action; and (3) identifies the IoT device 108 using the full 32-bit MSID. The third receive module 1908 is configured to receive from the wireless access node 106 (e.g., BSS 106) one or more repeated ATI messages 121 which complete the assignment of uplink packet resources. The second transmit module 1910 is configured to transmit to the wireless access node 106 (e.g., BSS 106) the requested report 122 (assuming this is the requested certain action). In the other embodiment, the fourth receive module 1912 is configured to receive from the wireless access node 106 (e.g., BSS 106) one or more repeated IA messages 119' each of which (1) assigns at least a portion of uplink packet resources; (2) optionally indicates the IoT device 108 is being requested to perform a certain action (e.g., transmit a specific type of report, start and stop of measurements); and (3) identifies the IoT device 108 using a portion of the 32-bit MSID. The fifth receive module 1914 is configured to receive from the wireless access node 106 (e.g., BSS 106) one or more repeated ATI messages 121' each of which includes at least a remaining portion of the 32-bit MSID. The third transmit module 1916 is configured to transmit to the wireless access node 106 (e.g., BSS 106) the requested report 122 (assuming this is the requested certain action).

Alternatively after the first receive module 1902 receives the message 115, the wireless device 108 (e.g., IoT device 108) can utilize the sixth receive module 1918 and the fourth transmit module 1920 when the message 115, 125 or 125' is one or more repeated IA messages 125 where each of which (1) assigns at least a portion of uplink packet resources; (2) indicates the IoT device 108 is being requested to perform the certain action (e.g., transmit a specific type of report, start and stop of measurements); and (3) identifies the IoT device 108 using the full 32-bit MSID. The sixth receive module 1918 is configured to the wireless device 108 (e.g., IoT device 108) receives from the wireless access node 106 (e.g., BSS 106) one or more repeated ATI messages 127 which complete the assignment of uplink packet resources. The fourth transmit module 1920 is configured to transmit to the wireless access node 106 (e.g., BSS 106) the requested report 122 (assuming this is the requested certain action).

Or after the first receive module 1902 receives the message 115, the wireless device 108 (e.g., IoT device 108) can utilize the seventh receive module 1922 and the fifth transmit module 1924 when the message 115, 125 or 125' is one or more repeated IA messages 125' where each of which (1) assigns at least a portion of uplink packet resources; (2) indicates the IoT device 108 is being requested to perform a certain action (e.g., transmit a specific type of report, start and stop of measurements); and (3) identifies the IoT device 108 using a portion of the 32-bit MSID. The seventh receive module 1922 is configured to receive from the wireless access node 106 (e.g., BSS 106) one or more repeated ATI messages 127' each of which includes at least a remaining portion of the 32-bit MSID. The fifth transmit module 1928 is configured to transmit to the wireless access node 106 (e.g., BSS 106) the requested report 122 (assuming this is the requested certain action).

In one case, before the first receive module 1902 receives the message 115, 125 or 125' the first perform module 1926 can be configured to perform a NAS signaling procedure (e.g., PDP Context Activation procedure, GPRS Attach Signaling procedure) with the second CN node 104 (e.g., SGSN 104) to transmit to the second CN node 104 (e.g., SGSN 104) information associated with the IoT device 108 including a UDP source port number and a range of UDP destination port numbers (see FIGS. 4-5 and 11 for a detailed description on how this UDP port information is used by the first and second CN nodes 102 and 104).

In another case, before the first receive module 1902 receives the message 115, 125 or 125' the second perform module 1926 can be configured to perform a PDP Context Activation procedure at step 1828 with the second CN node 104 (e.g., SGSN 104) to inform the second CN node 104 (e.g., SGSN 104) that when it receives an IP packet that is associated with the IoT device 108 and the IP packet has a payload that is less than a threshold of X octets then that IP packet is to be considered as a trigger for the IoT device 108 to perform a certain action (e.g., transmit a specific type of report, start and stop of measurements) (see FIG. 12 for a detailed description on how this information is used by the second CN node 104 (e.g., SGSN 104).

As those skilled in the art will appreciate, the above-described modules 1902, 1904, 1906, 1908, 1910, 1912, 1914, 1918, 1920, 1922, 1924, 1926, and 1928 of the wireless device 108 (e.g., IoT device 108) may be implemented separately as suitable dedicated circuits.

Further, the modules 1902, 1904, 1906, 1908, 1910, 1912, 1914, 1918, 1920, 1922, 1924, 1926, and 1928 can also be implemented using any number of dedicated circuits through functional combination or separation. In some embodiments, the modules 1902, 1904, 1906, 1908, 1910, 1912, 1914, 1918, 1920, 1922, 1924, 1926, and 1928 may be even combined in a single application specific integrated circuit (ASIC). As an alternative software-based implementation, the wireless device 108 (e.g., IoT device 108) may comprise the processing module 1930 which includes a memory 1932, and a processor 1934 (including but not limited to a microprocessor, a microcontroller or a Digital Signal Processor (DSP), etc.) (see FIG. 1). The memory 1932 stores machine-readable program code executable by the processor 1934 to cause the wireless device 108 (e.g., IoT device 108) to perform the steps of the above-described method 1800. It should be appreciated that the wireless device 108 (e.g., IoT device 108) also includes many other well-known components, but for clarity, only the components needed to describe the features of the present disclosure are described herein.

In view of the foregoing, the present disclosure provides a solution that allows a 3GPP CN node (e.g., a GGSN) to determine when an IP packet received from an external network node (e.g., an SCS) has been sent expressly for the purpose of notifying an IoT device to transmit a specific type of network triggered report. Once this case is recognized by the 3GPP CN node (e.g., a GGSN), the delivery of an IP packet (containing a network triggered report notification) to the target IoT device can be avoided in favor of using alternate mechanisms that allow for delivering the network triggered report notification to the IoT device in a far more signaling and bandwidth efficient manner. Further, the present disclosure discussed scenarios where a network trigger is delivered to an IoT device for the purpose to have that device transmit a report. However, a network trigger may also be delivered for triggering any kind of action by a group of IoT devices (e.g., when a single group trigger is received by multiple IoT devices) or by a group of devices that are connected to a single addressed IoT device (e.g., in the case of capillary networks). Further, it should be appreciated that although the problems addressed herein are from the perspective of a 2G GPRS system similar problems can be solved per the present disclosure for other wireless network systems. The following are some exemplary advantages of the present disclosure:

(1) Substantially reduced signaling and bandwidth needed over the radio interface for delivering a network triggered report indication to a cellular IoT device.

(2) Potential reduction in the amount of payload sent between a GGSN and a Serving GPRS Support Node (SGSN) for delivering a network triggered report indication to a cellular IoT device.

In the foregoing description, numerous specific details are set forth. However, it is understood that embodiments of the present disclosure may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

Further, it should be noted that wireless device used herein may refer generally to an end terminal (user) that attaches to the wireless communication network, and may refer to either an IoT device or MTC device (e.g., smart meter) or a non-IoT/MTC device. Thus, the term may be synonymous with the term mobile device, mobile station (MS), "User Equipment" or UE, as that term is used by the 3rd-Generation Partnership Project (3GPP), and includes standalone wireless devices, such as terminals, cell phones, tablets, smart phones, and wireless-equipped personal digital assistants, as well as wireless cards or modules that are designed for attachment to or insertion into another electronic device, such as a personal computer, electrical meter, etc.

Likewise, unless the context clearly indicates otherwise, the term wireless access node is used herein in the most general sense to refer to a base station or wireless access point in a wireless communication network, and may refer to wireless access nodes that are controlled by a physically distinct radio network controller as well as to more autonomous access points, such as the so-called evolved Node Bs (eNodeBs) in LTE networks.

Further it should be noted that references in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present disclosure may be carried out in other specific ways than those herein set forth without departing from the scope and essential characteristics of the invention. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure have been illustrated in the accompanying Drawings and described in the foregoing Detailed Description, it should be understood that the invention is not limited to the disclosed embodiments, but instead is also capable of numerous rearrangements, modifications and substitutions without departing from the present disclosure that as has been set forth and defined within the following claims.

The invention claimed is:

1. A wireless access node within a wireless communication system, the wireless access node comprising:
    a processor; and,
    a memory that stores processor-executable instructions, wherein the processor interfaces with the memory to execute the processor-executable instructions, whereby the wireless access node is operable to:
    receive, from a Core Network (CN) node, a paging request message which (1) indicates that a wireless device is being requested to perform a certain action, wherein the certain action is to transmit a specific type of report from the wireless device to an external node, and (2) identifies the wireless device using a 32-bit Mobile Station Identifier (MSID);
    wherein when the wireless access node does not have knowledge of a specific cell serving the wireless device then the wireless access node is further operable to:
    transmit, to the wireless device, another paging request message which (1) indicates that the wireless device is being requested to perform the certain action, and (2) identifies the wireless device using a portion of the 32-bit MSID;
    receive, from the wireless device, a packet channel request;
    transmit, to the wireless device, multiple repeated Immediate Assignment (IA) messages, each of which (1) assigns at least a portion of uplink packet resources; and (2) identifies the wireless device using the 32-bit MSID; and,
    transmit, to the wireless device, multiple repeated Additional Temporary Block Flow (TBF) Information (ATI) messages each of which completes the assignment of the uplink packet resources, wherein the multiple repeated IA messages and the multiple repeated ATI messages are always transmitted to the wireless device, and wherein a number of the multiple repeated IA messages and the multiple repeated ATI messages is based on a coverage class of the wireless device.

2. The wireless access node of claim 1, wherein the wireless access node is a Base Station Subsystem (BSS).

3. The wireless access node of claim 1, wherein the coverage class of the wireless device is based on estimating a number of blind repetitions of a radio block needed to satisfy a target Block Error Rate (BLER) and considering a number of Hybrid Automatic Repeat Request (HARQ) retransmissions of the radio block that will on average result from using the target BLER.

4. A wireless access node within a wireless communication system, the wireless access node comprising:
    a processor; and,
    a memory that stores processor-executable instructions, wherein the processor interfaces with the memory to execute the processor-executable instructions, whereby the wireless access node is operable to:
    receive, from a Core Network (CN) node, a paging request message which (1) indicates that a wireless device is being requested to perform a certain action, wherein the certain action is to transmit a specific type of report from the wireless device to an external node, and (2) identifies the wireless device using a 32-bit Mobile Station Identifier (MSID);
    wherein when the wireless access node does not have knowledge of a specific cell serving the wireless device then the wireless access node is further operable to:
    transmit, to the wireless device, another paging request message which (1) indicates that the wireless device is being requested to perform the certain action, and (2) identifies the wireless device using a portion of the 32-bit MSID;
    receive, from the wireless device, a packet channel request;
    transmit, to the wireless device, multiple repeated Immediate Assignment (IA) messages, each of which (1) assigns at least a portion of uplink packet resources; and (2) identifies the wireless device using the portion of the 32-bit MSID; and,
    transmit, to the wireless device, multiple repeated Additional Temporary Block Flow (TBF) Information (ATI) messages, each of which completes the assignment of the uplink packet resources and includes at least a remaining portion of the 32-bit MSID, wherein the multiple repeated IA messages and the multiple repeated ATI messages are always transmitted to the wireless device, and wherein a number of the multiple repeated IA messages and the multiple repeated ATI messages is based on a coverage class of the wireless device.

5. The wireless access node of claim 4, wherein the coverage class of the wireless device is based on estimating a number of blind repetitions of a radio block needed to satisfy a target Block Error Rate (BLER) and considering a number of Hybrid Automatic Repeat Request (HARQ) retransmissions of the radio block that will on average result from using the target BLER.

6. A wireless access node within a wireless communication system, the wireless access node comprising:
    a processor; and,
    a memory that stores processor-executable instructions, wherein the processor interfaces with the memory to execute the processor-executable instructions, whereby the wireless access node is operable to:
    receive, from a Core Network (CN) node, a paging request message which (1) indicates that a wireless device is being requested to perform a certain action, wherein the certain action is to transmit a specific type of report from the wireless device to an external node, and (2) identifies the wireless device using a 32-bit Mobile Station Identifier (MSID);

wherein when the wireless access node has knowledge of a specific cell serving the wireless device then the wireless access node is further operable to:

transmit, to the wireless device, multiple repeated Immediate Assignment (IA) messages, each of which (1) assigns at least a portion of uplink packet resources; (2) indicates that the wireless device is being requested to perform the certain action; and (3) identifies the wireless device using the 32-bit MSID; and, transmit, to the wireless device, multiple repeated Additional Temporary Block Flow (TBF) Information (ATI) messages each of which completes the assignment of the uplink packet resources, wherein the multiple repeated IA messages and the multiple repeated ATI messages are always transmitted to the wireless device, and wherein a number of the multiple repeated IA messages and the multiple repeated ATI messages is based on a coverage class of the wireless device.

7. The wireless access node of claim 6, wherein th e coverage class of the wireless device is based on estimating a number of blind repetitions of a radio block needed to satisfy a target Block Error Rate (BLER) and considering a number of Hybrid Automatic Repeat Request (HARQ) retransmissions of the radio block that will on average result from using the target BLER.

8. A wireless access node within a wireless communication system, the wireless access node comprising:

a processor; and, a memory that stores processor-executable instructions, wherein the processor interfaces with the memory to execute the processor-executable instructions, whereby the wireless access node is operable to:

receive, from a Core Network (CN) node, a paging request message which (1) indicates that a wireless device is being requested to perform a certain action, wherein the certain action is to transmit a specific type of report from the wireless device to an external node, and (2) identifies the wireless device using a 32-bit Mobile Station Identifier (MSID);

wherein when the wireless access node has knowledge of a specific cell serving the wireless device then the wireless access node is further operable to:

transmit, to the wireless device, multiple repeated Immediate Assignment (IA) messages, each of which (1) assigns at least a portion of uplink packet resources; (2) indicates that the wireless device is being requested to perform a certain action; and (3) identifies the wireless device using a portion of the 32-bit MSID; and, transmit, to the wireless device, multiple repeated Additional Temporary Block Flow (TBF) Information (ATI) messages, each of which completes the assignment of the uplink packet resources and includes at least a remaining portion of the 32-bit MSID, wherein the multiple repeated IA messages and the multiple repeated ATI messages are always transmitted to the wireless device, and wherein a number of the multiple repeated IA messages and the multiple repeated ATI messages is based on a coverage class of the wireless device.

9. The wireless access node of claim 8, wherein the coverage class of the wireless device is based on estimating a number of blind repetitions of a radio block needed to satisfy a target Block Error Rate (BLER) and considering a number of Hybrid Automatic Repeat Request (HARQ) retransmissions of the radio block that will on average result from using the target BLER.

10. A method in a wireless access node within a wireless communication system, the method comprising:

receiving, by the wireless access node from a Core Network (CN) node, a paging request message which (1) indicates that a wireless device is being requested to perform a certain action, wherein the certain action is to transmit a specific type of report from the wireless device to an external node, and (2) identifies the wireless device using a 32-bit Mobile Station Identifier (MSID);

wherein when the wireless access node does not have knowledge of a specific cell serving the wireless device then the method further comprises:

transmitting, from the wireless access node to the wireless device, another paging request message which (1) indicates that the wireless device is being requested to perform the certain action, and (2) identifies the wireless device using a portion of the 32-bit MSID; and, receiving, by the wireless access node from the wireless device, a packet channel request;

transmitting, by the wireless access node to the wireless device, multiple repeated Immediate Assignment (IA) messages, each of which (1) assigns at least a portion of uplink packet resources; and (2) identifies the wireless device using the 32-bit MSID; and, transmitting, by the wireless access node to the wireless device, multiple repeated Additional Temporary Block Flow (TBF) Information (ATI) messages each of which completes the assignment of the uplink packet resources, wherein the multiple repeated IA messages and the multiple repeated ATI messages are always transmitted to the wireless device, and wherein a number of the multiple repeated IA messages and the multiple repeated ATI messages is based on a coverage class of the wireless device.

11. The method of claim 10, wherein the wireless access node is a Base Station Subsystem (BSS).

12. The method of claim 10, wherein the coverage class of the wireless device is based on estimating a number of blind repetitions of a radio block needed to satisfy a target Block Error Rate (BLER) and considering a number of Hybrid Automatic Repeat Request (HARQ) retransmissions of the radio block that will on average result from using the target BLER.

13. A method in a wireless access node within a wireless communication system, the method comprising:

receiving, by the wireless access node from a Core Network (CN) node, a paging request message which (1) indicates that a wireless device is being requested to perform a certain action, wherein the certain action is to transmit a specific type of report from the wireless device to an external node, and (2) identifies the wireless device using a 32-bit Mobile Station Identifier (MSID);

wherein when the wireless access node does not have knowledge of a specific cell serving the wireless device then the method further comprises:

transmitting, from the wireless access node to the wireless device, another paging request message which (1) indicates that the wireless device is being requested to perform the certain action, and (2) identifies the wireless device using a portion of the 32-bit MSID; and, receiving, by the wireless access node from the wireless device, a packet channel request;

transmitting, by the wireless access node to the wireless device, multiple repeated Immediate Assignment (IA) messages, each of which (1) assigns at least a portion of uplink packet resources; and (2) identifies the wireless device using the portion of the 32-bit MSID; and, transmitting, by the wireless access node to the wireless device, multiple repeated Additional Temporary Block Flow (TBF) Information (ATI) messages, each of which completes the assignment of the uplink packet resources and includes at least a remaining portion of the 32-bit MSID, wherein the multiple repeated IA messages and the multiple repeated ATI messages are always transmitted to the wireless device, and wherein a number of the multiple repeated IA messages and the multiple repeated ATI messages is based on a coverage class of the wireless device.

14. The method of claim 13, wherein the coverage class of the wireless device is based on estimating a number of blind repetitions of a radio block needed to satisfy a target Block Error Rate (BLER) and considering a number of Hybrid Automatic Repeat Request (HARQ) retransmissions of the radio block that will on average result from using the target BLER.

15. A method in a wireless access node within a wireless communication system, the method comprising:

receiving, by the wireless access node from a Core Network (CN) node, a paging request message which (1) indicates that a wireless device is being requested to perform a certain action, wherein the certain action is to transmit a specific type of report from the wireless device to an external node, and (2) identifies the wireless device using a 32-bit Mobile Station Identifier (MSID);

wherein when the wireless access node has knowledge of a specific cell serving the wireless device then the method further comprises:

transmitting, by the wireless access node to the wireless device, multiple repeated Immediate Assignment (IA) messages, each of which (1) assigns at least a portion of uplink packet resources; (2) indicates that the wireless device is being requested to perform the certain action; and (3) identifies the wireless device using the 32-bit MSID; and, transmitting, by the wireless access node to the wireless device, multiple repeated Additional Temporary Block Flow (TBF) Information (ATI) messages each of which completes the assignment of the uplink packet resources, wherein the multiple repeated IA messages and the multiple repeated ATI messages are always transmitted to the wireless device, and wherein a number of the multiple repeated IA messages and the multiple repeated ATI messages is based on a coverage class of the wireless device.

16. The method of claim 15, wherein the coverage class of the wireless device is based on estimating a number of blind repetitions of a radio block needed to satisfy a target Block Error Rate (BLER) and considering a number of Hybrid Automatic Repeat Request (HARQ) retransmissions of the radio block that will on average result from using the target BLER.

17. A method in a wireless access node within a wireless communication system, the method comprising:

receiving, by the wireless access node from a Core Network (CN) node, a paging request message which (1) indicates that a wireless device is being requested to perform a certain action, wherein the certain action is to transmit a specific type of report from the wireless device to an external node, and (2) identifies the wireless device using a 32-bit Mobile Station Identifier (MSID);

wherein when the wireless access node has knowledge of a specific cell serving the wireless device then the method further comprises:

transmitting, by the wireless access node to the wireless device, multiple repeated Immediate Assignment (IA) messages, each of which (1) assigns at least a portion of uplink packet resources; (2) indicates that the wireless device is being requested to perform a certain action; and (3) identifies the wireless device using a portion of the 32-bit MSID; and, transmitting, by the wireless access node to the wireless device, multiple repeated Additional Temporary Block Flow (TBF) Information (ATI) messages, each of which completes the assignment of the uplink packet resources and includes at least a remaining portion of the 32-bit MSID, wherein the multiple repeated IA messages and the multiple repeated ATI messages are always transmitted to the wireless device, and wherein a number of the multiple repeated IA messages and the multiple repeated ATI messages is based on a coverage class of the wireless device.

18. The method of claim 17, wherein the coverage class of the wireless device is based on estimating a number of blind repetitions of a radio block needed to satisfy a target Block Error Rate (BLER) and considering a number of Hybrid Automatic Repeat Request (HARQ) retransmissions of the radio block that will on average result from using the target BLER.

* * * * *